United States Patent
Shiraishi

(10) Patent No.: US 7,573,614 B2
(45) Date of Patent: Aug. 11, 2009

(54) IMAGE PROCESSING APPARATUS, IMAGE PROCESSING METHOD, AND COMPUTER PRODUCT

(75) Inventor: Naoto Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 922 days.

(21) Appl. No.: 11/024,275

(22) Filed: Dec. 27, 2004

(65) Prior Publication Data

US 2005/0151991 A1 Jul. 14, 2005

(30) Foreign Application Priority Data

Dec. 26, 2003 (JP) ............... 2003-433826
Oct. 29, 2004 (JP) ............... 2004-316970

(51) Int. Cl.
*G06K 19/00* (2006.01)
*G06K 15/00* (2006.01)
*G08B 1/08* (2006.01)

(52) U.S. Cl. ............ 358/3.28; 358/1.14; 340/5.61; 340/5.86; 340/539.1

(58) Field of Classification Search ........... 358/474, 358/475, 448, 443, 3.28, 1.15, 435, 438, 358/439, 1.14; 348/14.02; 340/5.61, 5.86, 340/539.1

See application file for complete search history.

(56) References Cited

U.S. PATENT DOCUMENTS

| | | | |
|---|---|---|---|
| 5,671,277 | A | 9/1997 | Ikenoue et al. |
| 6,738,491 | B1 | 5/2004 | Ikenoue et al. |
| 2002/0075532 | A1 | 6/2002 | Shiraishi |
| 2002/0135810 | A1 | 9/2002 | Ikenoue et al. |
| 2003/0053701 | A1 | 3/2003 | Shiraishi |
| 2003/0063813 | A1 | 4/2003 | Shiraishi |
| 2004/0066273 | A1 * | 4/2004 | Cortina et al. ............ 340/5.1 |
| 2004/0105571 | A1 | 6/2004 | Ikenoue et al. |
| 2005/0007236 | A1 * | 1/2005 | Lane et al. ............ 340/5.86 |
| 2005/0029353 | A1 * | 2/2005 | Isemura et al. ............ 235/454 |
| 2006/0103533 | A1 * | 5/2006 | Pahlavan et al. ......... 340/572.1 |

FOREIGN PATENT DOCUMENTS

JP HEI 2-210591 A 8/1990

(Continued)

OTHER PUBLICATIONS

Shiio, Ichiro and Hayasaka, Toru, Radio tag for attaching Information to Articles and Applications thereof, Information Processing Society of Japan, IPSJ Magazine, vol. 40, No. 8, Aug. 1999, pp. 846-850.

(Continued)

*Primary Examiner*—Jerome Grant, II
(74) *Attorney, Agent, or Firm*—Blakely, Sokoloff, Taylor & Zafman LLP

(57) ABSTRACT

In an image processing apparatus, an antenna is arranged in a traveling member of a scanner, a reader/writer receives a radio wave from a radio tag added to an original via the antenna when the reader/writer reads an image from the original, a demodulation circuit generates a demodulated signal, a radio tag identification number identifying and judging unit, which has received the demodulated signal, identifies a type of the radio tag, and when it is judged that the original is a forgery prevention object original, a forgery prevention processing unit applies forgery prevention processing to the original.

9 Claims, 18 Drawing Sheets

FOREIGN PATENT DOCUMENTS

| | | |
|---|---|---|
| JP | 6022062 | 1/1994 |
| JP | HEI 6-054186 A | 2/1994 |
| JP | HEI 6-105136 A | 4/1994 |
| JP | 6-340112 | 12/1994 |
| JP | 2003-037694 | 2/2003 |
| JP | 2003-345184 | 12/2003 |
| JP | 02005208575 * | 8/2005 |

OTHER PUBLICATIONS

Office Action mailed Aug. 1, 2006, 1 page, appears to be document 200412125.

Official Action in Japanese application, mailed Feb. 14, 2006.

* cited by examiner

```
                                                65
RADIO TAG ACCESS RECORD
1)  TIME:      2003/09/10:12:30
2)  TYPE: BOOK
3)  MANUFACTURER : * * * *
4)  TITLE:              * * * * *
5)  NUMBER OF COPIES: 10 PAGES
```

```
                                                66
RADIO TAG ACCESS RECORD
1)  TIME:      2003/09/10:12:30
2)  TYPE: GIFT CERTIFICATE
3)  MANUFACTURER:         * * * *
4)  TERM OF VALIDITY: 2002/01/01 TO 2010/01/01
5)  REGISTRATION NUMBER:0123456789
```

```
                                                67
PAGE HEADER
1)  ENCODING SYSTEM:     JPEG
2)  FORGERY PREVENTION FLAG:  "1"
3)  TRACING PATTERN NUMBER:    2
4)  QUANTIZATION TABLE
```

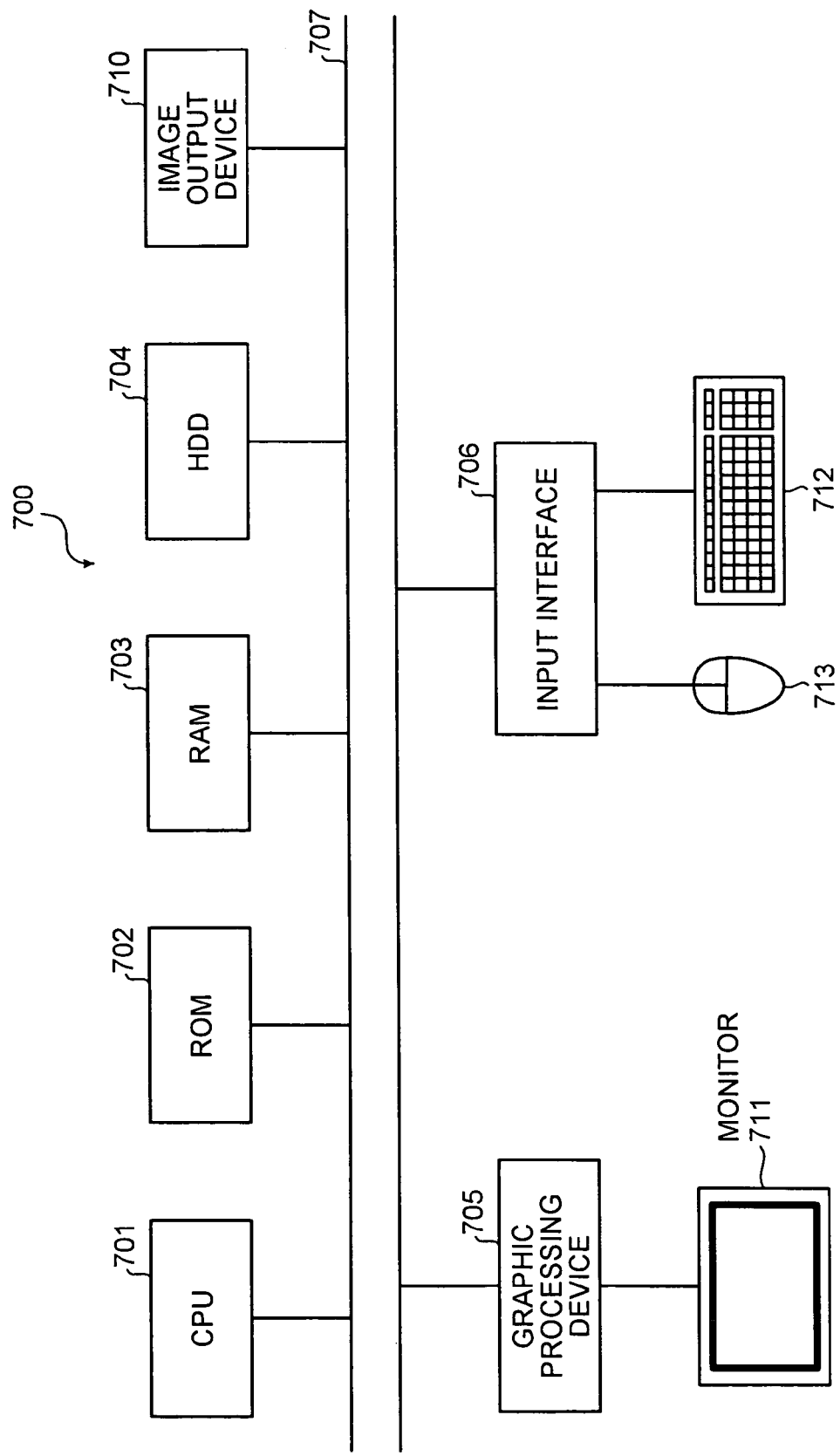

US 7,573,614 B2

IMAGE PROCESSING APPARATUS, IMAGE PROCESSING METHOD, AND COMPUTER PRODUCT

RELATED APPLICATIONS

The present document incorporates by reference and claims priority to the entire contents of Japanese priority documents, 2003-433826 filed in Japan on Dec. 26, 2003 and 2004-316970 filed in Japan on Oct. 29, 2004.

BACKGROUND OF THE INVENTION

1. Field of the Invention

The present invention relates to a technology for processing a document with an appended radio frequency identification tag.

2. Description of the Related Art

In recent years, there is a tremendous improvement in the quality of images formed using image processing apparatus such as full-color copying machines. As a result, there is an increasing likelihood of forgery of documents such as cash notes and security bills (hereinafter, "specific originals").

Japanese Patent Application Laid-Open No. H6-105136 proposes an image processing apparatus that includes a correcting unit that corrects characteristics of an inputted color image signal to obtain a corrected image signal; an extracting unit that extracts characteristics in the corrected image signal obtained by the correcting unit; a forgery judging unit that judges similarity between the characteristics extracted by the extracting unit and characteristics of specific originals prepared in advance; and a changing unit that changes contents of processing for the inputted color image signal according to the similarity judged by the forgery judging unit.

Moreover, Japanese Patent Application Laid-Open No. H2-210591 and Japanese Patent Application Laid-Open No. H6-54186 propose techniques for image processing apparatuses that register an image pattern of specific originals in advance, compare a pattern of an inputted image and the registered image pattern to judge similarity between the patterns, and determine whether the inputted image is an image of the specific original to thereby prevent the specific original from being forged.

On the other hand, in "Radio tag for attaching Information to Articles and Applications thereof", Information Processing Society of Japan, IPSJ Magazine, vol. 40, No. 8, pp. 846 to 850 (August 1999), it is mentioned that an ID element (RFID: Radio Frequency Identification) technology for holding individual information electronically and transmitting the information in a non-contact manner has been developed and started to be applied for identification and management of articles. Note that, as a conventional compression system, a system for converting image data into a frequency component with orthogonal conversion like DCT and quantizing a conversion factor for the frequency component is known. In particular, as a system encoding a multi-valued image using the DCT, the JPEG system standardized by ITU-T and ISO is known. A DCT arithmetic expression of JPEG is as follows.

$$Suv = \frac{C(u)*C(v)}{4} \sum_{x=0}^{7}\sum_{y=0}^{7} syx * \cos\left[\frac{(2*x+1)*u*\pi}{16}\right] * \cos\left[\frac{(2*y+1)*v*\pi}{16}\right] \quad (1)$$

$$syx = \frac{1}{4}\sum_{x=0}^{7}\sum_{y=0}^{7} C(u)\cdot C(v) * Suv * \cos\left[\frac{(2*x+1)*u*\pi}{16}\right] * \cos\left[\frac{(2*y+1)*v*\pi}{16}\right] \quad (2)$$

$u, v = 0, 1, \sim 7$ where $$C(W) = \begin{cases} \frac{1}{\sqrt{2}} & \text{when } W = 0 \\ 1.0 & \text{when } W = 1, \sim 7 \end{cases}$$

However, in the case of a full-color copying machine, each image reading apparatus has a different image reading characteristic. Even if the image reading apparatuses have identical configuration or they look identical, amount of lights emitted from lamps of each image reading apparatus is different depending various factors. Even the specific originals may have various concentrations or the specific originals may be soiled or worn-out which makes an image thereon unclear. Therefore, in the conventional systems, there is a problem in that, since a level of an image signal from an image reading apparatus fluctuates, the accuracy of correctly determining whether an original is a specific original fails.

Even if an image pattern of a specific original is registered in a copying machine, when the image pattern of the specific original is inputted with a magnification thereof changed, it is likely that the specific original is forged because it is judged that similarity between the inputted image pattern and the registered image pattern is low. Therefore, the image pattern of the specific original has to be registered in association with all magnifications. In this case, there is a problem in that a memory with a large capacity is required, determination processing is complicated, and the accuracy of correctly whether an original is a specific original falls.

In addition, in recent years, in accordance with an improvement of an image quality of an image formed by the image processing apparatus such as the full-color copying machine, when a book or the like is copied using a copying machine in a public library or a library in a company, there is a problem of infringement of copyright owned by a publishing company through the copying of the book.

SUMMARY OF THE INVENTION

An image processing apparatus, image processing method, and computer product are disclosed. In one embodiment, the apparatus comprises a radio wave receiving unit that is disposed in a traveling member of the reading unit and receives a radio wave transmitted from the radio tag at the time when the document is read by the reading unit, a radio demodulation unit that demodulates the radio wave received by the radio wave receiving unit to obtain a demodulated signal, an identification unit that identifies identification information for the radio tag from the demodulated signal, a forgery judging unit that judges whether the document is a forgery prevention object according to the identification information identified by the identification unit, and a forgery preventing unit that, when the forgery judging unit judges that the document is the forgery prevention object, applies forgery prevention processing to the read image data.

BRIEF DESCRIPTION OF THE DRAWINGS

Other objects and further features of the present invention will be apparent from the following detailed description when read in conjunction with the accompanying drawings, in which:

FIG. 23 is a diagram of an example of a hardware structure of the image processing apparatus.

DETAILED DESCRIPTION

Figure 1:
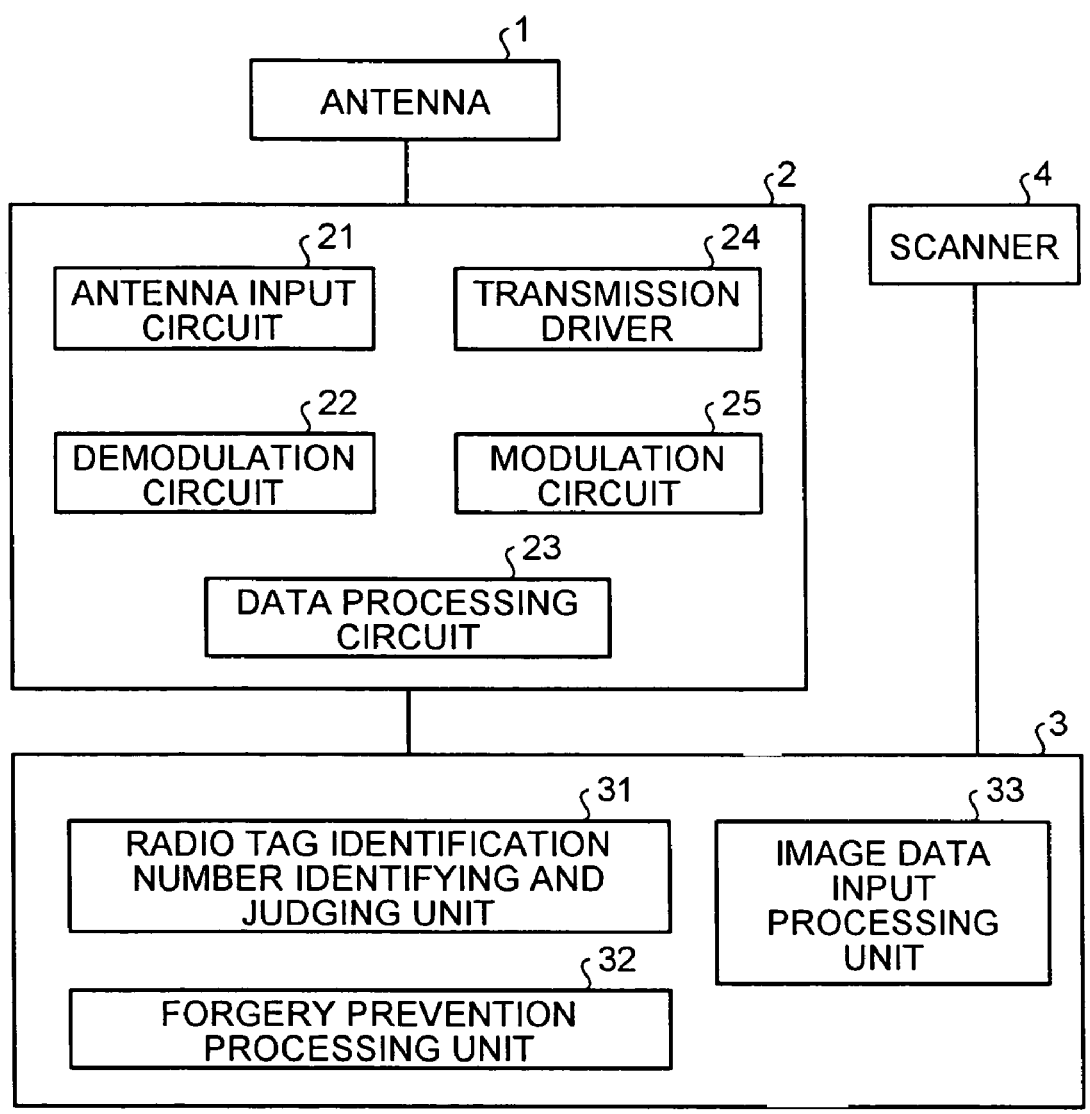
FIG. 1 is a functional block diagram of an image processing apparatus according to a first embodiment of the invention.

An image processing apparatus according to an aspect of the present invention reads a document to be copied. The document to be copied may be an original document with an added radio tag. The document to be copied may be read with a reading unit and applies image processing to read image data. The image processing apparatus includes a radio wave receiving unit that is disposed in a traveling member of the reading unit and receives a radio wave transmitted from the radio tag at the time when the document is read by the reading unit; a radio demodulation unit that demodulates the radio wave received by the radio wave receiving unit to obtain a demodulated signal; an identification unit that identifies identification information for the radio tag from the demodulated signal; a forgery judging unit that judges whether the document is a forgery prevention object according to the identification information identified by the identification unit; and a forgery preventing unit that, when the forgery judging unit judges that the document is the forgery prevention object, applies forgery prevention processing to the read image data.

An image processing apparatus according to another aspect of the present invention reads a document to be copied. The document to be copied may be an original document with an added radio tag. The document to be copied may be read with a reading unit and applies accounting to image processing for read image data. The image processing apparatus includes a radio wave receiving unit that is disposed in a traveling member of the reading unit and receives a radio wave transmitted from the radio tag at the time when the document is read by the reading unit; a radio demodulation unit that demodulates the radio wave received by the radio wave receiving unit to obtain a demodulated signal; an identification unit that identifies identification information for the radio tag from the demodulated signal; an accounting judging unit that judges whether the document is an accounting object original requiring accounting for the image processing for the read image data according to the identification information identified by the identification unit; and an accounting unit that, when the accounting judging unit judges that the document is the accounting object, applies accounting to the image processing for the image data.

An image processing method according to still another aspect of the present invention is a method for reading a document to be copied and applying image processing to read image data. The document to be copied may be an original document with an added radio tag. The image processing method includes receiving a radio wave transmitted from the radio tag at the time when the document is read; demodulating the radio wave received to obtain a demodulated signal; identifying identification information for the radio tag from the demodulated signal; judging whether the document is a forgery prevention object according to the identification information identified; and applying forgery prevention processing to the read image data when it is judged in the forgery judging step that the document is the forgery prevention object.

An image processing method according to still another aspect of the present invention is a method for reading an original article with an added radio tag and applies accounting to image processing for read image data. The image processing method includes receiving a radio wave transmitted from the radio tag at the time when the original article is read; demodulating the radio wave received to obtain a demodulated signal; identifying identification information for the radio tag from the demodulated signal; judging whether the original article is an accounting object original requiring accounting for the image processing for the read image data according to the identification information; and carrying out accounting processing to the image processing for the image data when it is judged in the judging that the original article is the accounting object.

Computer-readable recording media according to still other aspects of the present invention store therein a computer program that cause a computer to execute the above image processing methods according to one embodiment of the present invention.

The other objects, features, and advantages of the present invention are specifically set forth in or will become apparent from the following detailed description of the invention when read in conjunction with the accompanying drawings.

An individual recognition system that uses an ID element may be a competitor technology for the barcodes in the field of distribution. In particular, it is considered possible to prevent forgery of cash notes or concert tickets, or the like by storing special encryption data in a radio tag and embedding the radio tag in the cash notes or the concert tickets.

Scanners of copying machines or the like read an original line-by-line by moving in a main scanning direction a traveling member having a one-dimensional array of CCDs in a sub-scanning direction. As a system for preventing copying of bills, securities, or the like using the reading of image data, a system for, when a color image forming apparatus judges that an article is a bill, a security, or the like at the time of copying, adding information specifying a model and a serial number of the color image forming apparatus (hereinafter referred to as "tracing pattern") to a copy image of this bill, security, or the like and outputting the copy image is known. According to this system, forgery of the bill, the security, or the like through the copying of the bill, the security, or the like is prevented.

Exemplary embodiments of an image processing apparatus, an image processing method, and a computer product according to one embodiment of the present invention will be hereinafter explained in detail with reference to the accompanying drawings.

FIG. 1 is a functional block diagram of an image processing apparatus according to an embodiment of the invention. The image processing apparatus includes an antenna 1, a reader/writer 2, an image processing unit 3, and a scanner 4. The reader/writer 2 includes an antenna input circuit 21, a demodulation circuit 22, a data processing circuit 23, a transmission driver 24, and a modulation circuit 25. The image processing unit 3 includes a radio tag identification number identifying and judging unit 31, a forgery prevention processing unit 32, and an image data input processing unit 33.

The antenna 1 is disposed in a traveling member for reading an image and transmits and receives a radio wave for communicating with a radio tag incorporated in a document to be copied.

The reader/writer 2 communicates with the radio tag incorporated in the original document to be copied via the antenna 1. The antenna input circuit 21 receives a radio wave from the antenna 1 and controls the reception and transmission antenna. The demodulation circuit 22 demodulates the received radio wave. The data processing circuit 23 subjects the demodulated radio wave to signal processing and transmits a signal to the image processing unit 3. The data processing circuit 23 processes a signal from the image processing unit 3 and transmits the signal to the modulation circuit 25. The modulation circuit 25 modulates the signal from the data processing circuit 23 and transmits the signal to the transmission driver 24. The transmission driver 24 transmits a radio wave to the radio tag embedded in the original document.

The scanner 4 reads the original. The image data input processing unit 33 subjects image data read by the scanner 4 to image processing. Details of the processing applied to the image data by the image data input processing unit 33 will be described later.

The radio tag identification number identifying and judging unit 31 identifies identification information of the radio tag received from the reader/writer 2 and judges whether the original is a specific original. When the radio tag identification number identifying and judging unit 31 judges that the original to be copied is the specific original, the forgery prevention processing unit 32 applies forgery prevention processing to the image data subjected to the image processing by the image data input processing unit 33.

Here, the antenna 1 constitutes a radio wave receiving unit. The antenna input circuit 21 and the demodulation circuit 22 constitute a radio modulation unit. The radio tag identification number identifying and judging unit 31 constitutes an identification unit and a forgery judging unit. The forgery prevention processing unit 32 constitutes a forgery preventing unit.

Figure 2:
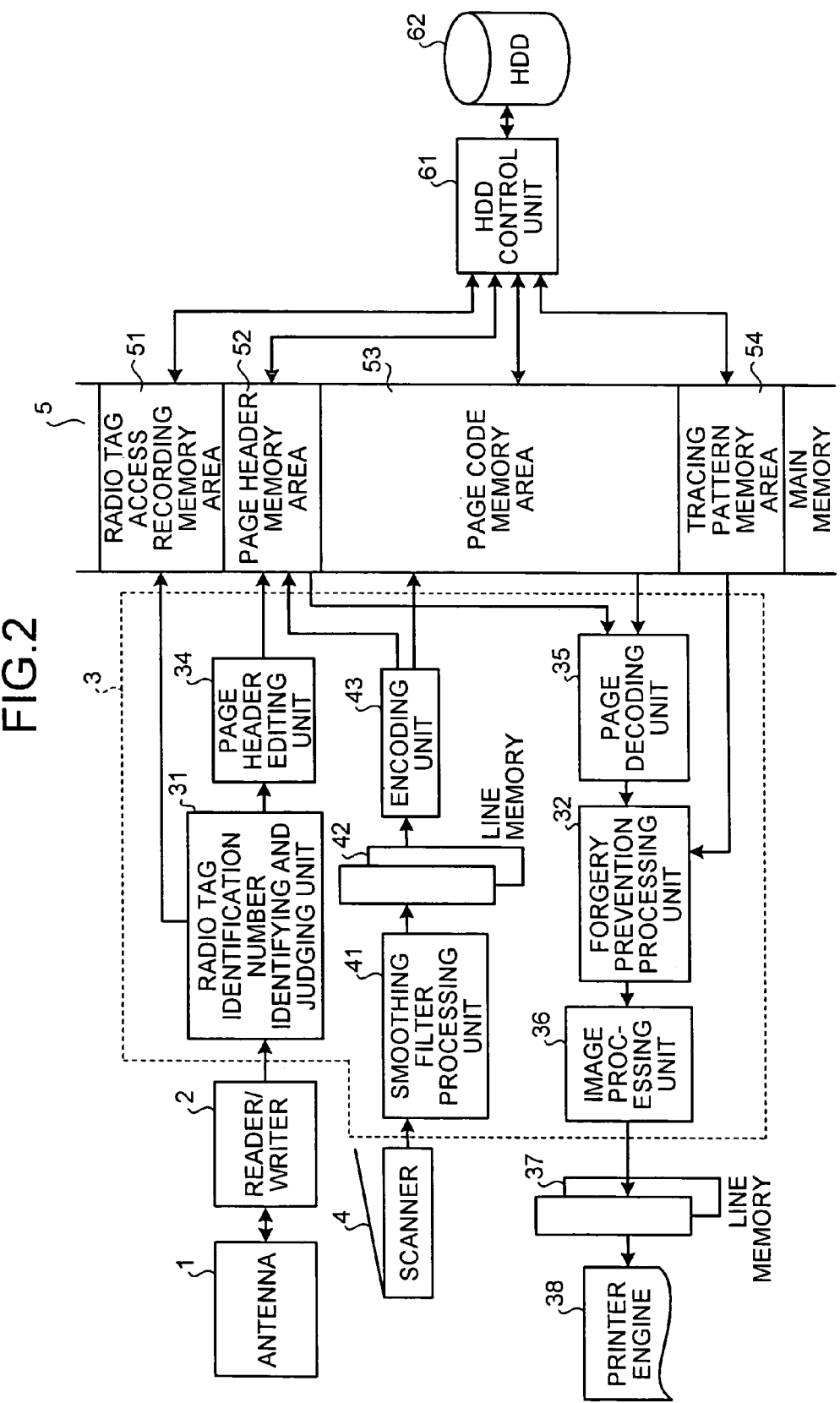
FIG. 2 is an overall diagram of the image processing apparatus.
Figure 3:
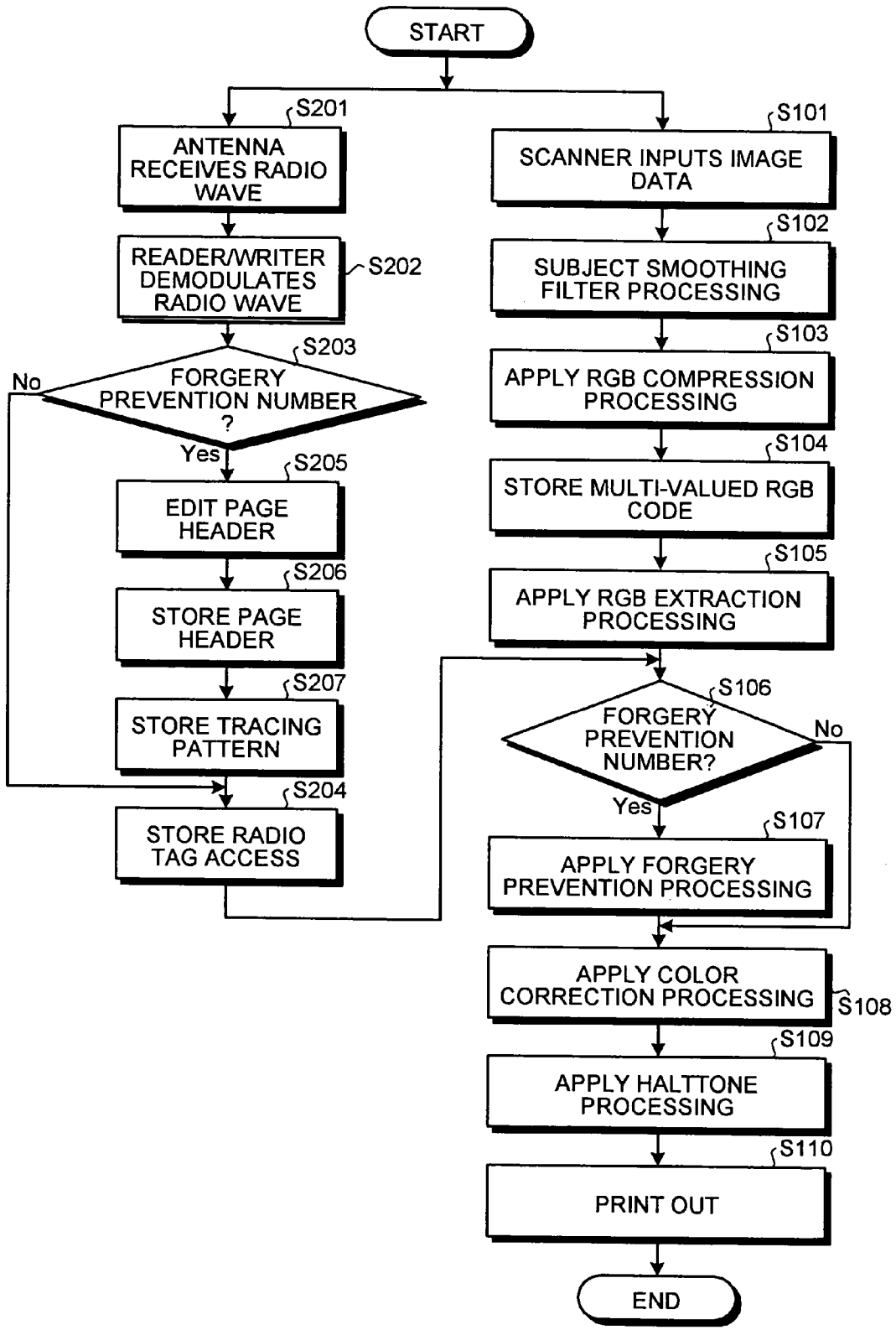
FIG. 3 is a flowchart illustrating an image processing procedure according to the first embodiment.
Figure 4:
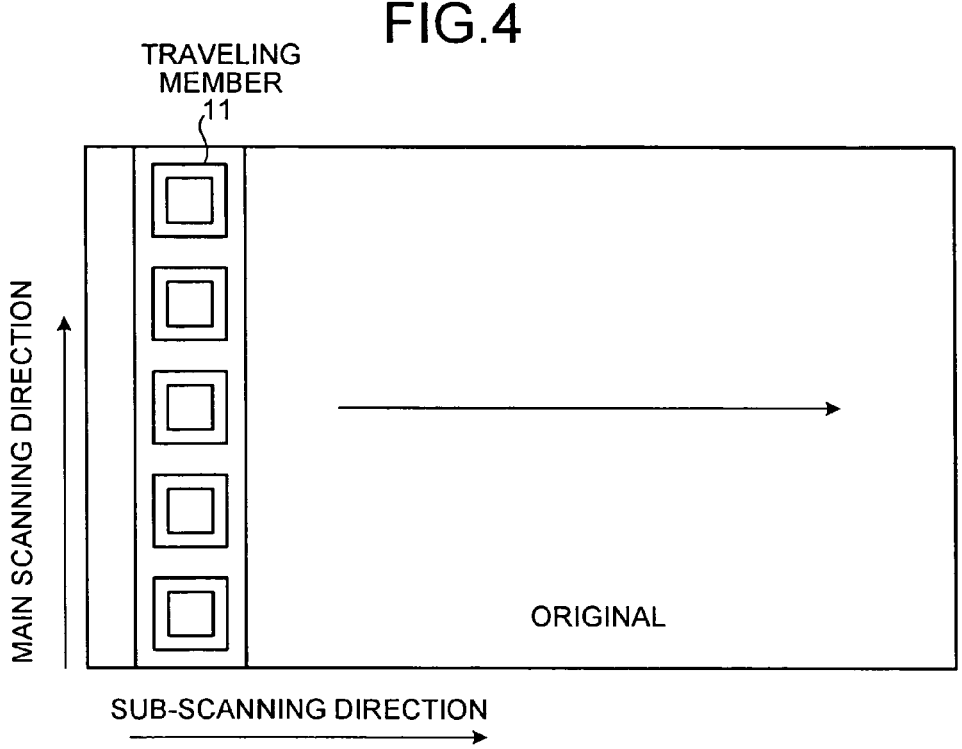
FIG. 4 is a schematic diagram of antennas that are disposed in an original reading traveling member and move on an original surface.
Figure 5:
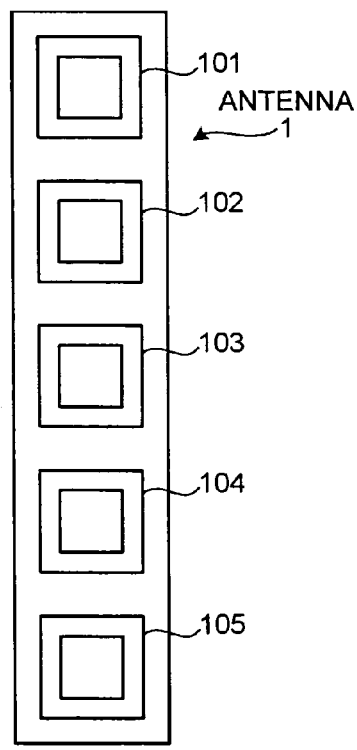
FIG. 5 is a schematic diagram illustrating an arrangement of the antennas disposed in the original reading traveling member.

FIG. 2 is an overall diagram of the image processing apparatus. FIG. 3 is a flowchart illustrating an image processing procedure according to the first embodiment. FIG. 4 is a schematic diagram of antennas that are disposed in an original reading traveling member and move on an original surface. FIG. 5 is a schematic diagram illustrating an arrangement of the antennas disposed in the original reading traveling member. Functions of the respective units of the image processing apparatus according to the first embodiment will be explained in accordance with the processing procedure with reference to FIGS. 2 to 5.

The scanner 4 reads an image on an original (step S101). A smoothing filter processing unit 41 subjects image data read from the scanner to image processing like shading correction, MRFγ correction, and smoothing filter processing (step S102) and writes the image data after the processing in a line memory 42.

The line memory 42 temporarily stores the data subjected to the image processing by the smoothing filter processing unit 41.

An encoding unit 43 encodes the image data from the line memory 42, writes a code in a page code memory area 53 of a main memory 5, and writes a quantization table in a page header memory area 52. Here, RGB compression processing (step S103) and multi-valued RGB code storage processing are applied to the image data subjected to the smoothing filter processing to store a multi-valued RGB code (step S104).

The antenna 1 transmits a radio wave to the radio tag and receives a radio wave from the radio tag while moving in a sub-scanning direction. The reader/writer 2 transmits a request for response from the radio tag to the antenna 1 and receives a response from the radio tag (step S201) and demodulates the received radio wave (step S202).

The radio tag identification number identifying and judging unit 31 identifies an identification number of the radio tag transmitted from the reader/writer 2 and judges whether the identification number is a number of a forgery prevention object (step S203). If it is judged that the identification number is not the number of the forgery prevention object (No in step S203), radio tag access is stored, and the processing proceeds to an image formation step (step S204). On the other hand, if it is judged that the identification number is the number of the forgery prevention object (Yes in step S203), a page header editing unit 34 receives a result of the judgment on the forgery prevention object from the radio tag identification number identifying and judging unit 31, edits a page header (step S204), and stores the page header, which indicates that the original is the forgery prevention object, in the page header memory area 52 of the main memory 5 (step S206).

The main memory 5 stores page code data generated by the encoding unit 43 in the page code memory area 53 and stores forgery prevention object information from the page header editing unit 34 and a quantization table value from the encoding unit 43 in the page header memory area 52. In addition, the main memory 5 stores radio tag information judged by the radio tag identification number identifying and judging unit 31 in a radio tag access recording memory area 51 and stores a tracing pattern subjected to prevention processing by the forgery prevention processing unit 32 in a tracing pattern memory area 54 (step S207).

When the original is the forgery prevention object, data concerning the detected radio tag is also recorded in the radio tag access recording area 51 of the main memory 51 (step S204).

A page decoding unit 35 reads the quantization table and the forgery prevention object information from the page header memory area 52, sequentially reads codes from the page code memory area 53 and decodes the codes, and transfers the codes to the forgery prevention processing unit 32 (step S105).

The forgery prevention processing unit 32 judges whether the identification number is the number of the forgery prevention object (step S106). If the identification number is not the number of the forgery prevention object (No in step S106), the forgery prevention processing unit 32 applies color correction processing, which is usual image processing, to the original (step S108). When the forgery prevention processing unit 32 judges that the identification number is the number of the forgery prevention object (Yes in step S106), the forgery prevention processing unit 32 reads the tracing pattern information stored in the tracing pattern memory area 54 in step S207 to apply synthesizing, that is, forgery prevention processing to the image data decoded by the page decoding unit 35, (step S107), and transfers the image data to the image processing unit 36.

The image processing unit 36 receives the image data transferred from the forgery prevention processing unit 32, applies the color correction processing (step S108) and halftone processing (step S109) to the image data, and transfers the image data to a line memory 37.

The line memory 37 temporarily stores the image data subjected to the image processing by the image processing unit 36.

A printer engine 38 outputs an image (step S110).

A hard disk (HDD) control unit 61 controls a hard disk (HDD) 62. The HDD 62 stores information like a page code, a tracing pattern, a page header, and a radio tag access record stored in the main memory 5.

Figure 21:
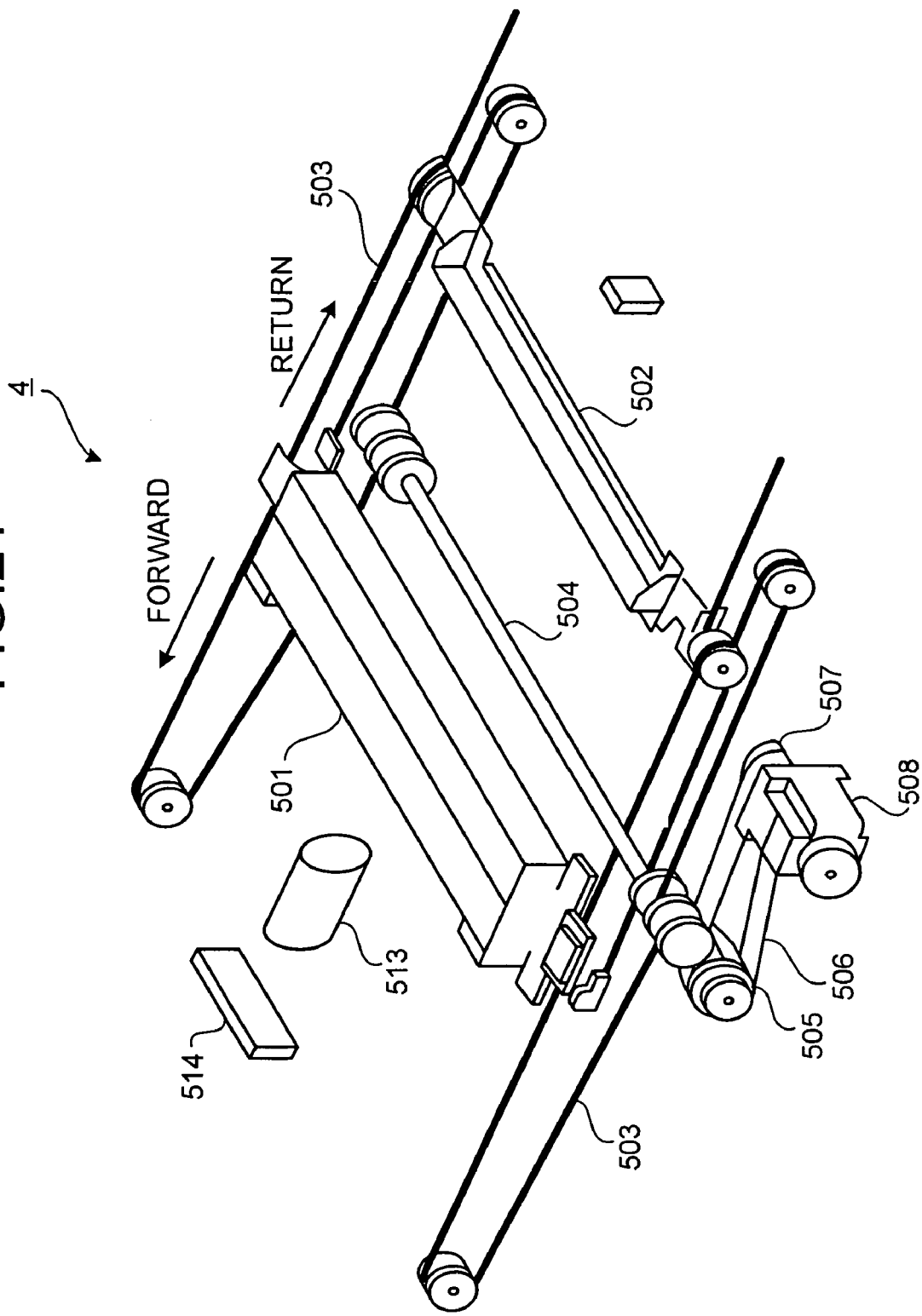
FIG. 21 is a schematic diagram of a scanner included in the copying machine shown in FIG. 20.

As shown in FIG. 4, antennas 101 to 105 are disposed on a traveling member 11 (reference numeral 501 in FIG. 21). As shown in FIG. 5, the traveling member 11 having the antennas 101 to 105 disposed thereon moves in a sub-scanning direction with respect to the original. The antennas 101 to 105 are disposed as shown in FIGS. 4 and 5 to thereby receive a radio wave transmitted from the radio tag.

Figure 6:
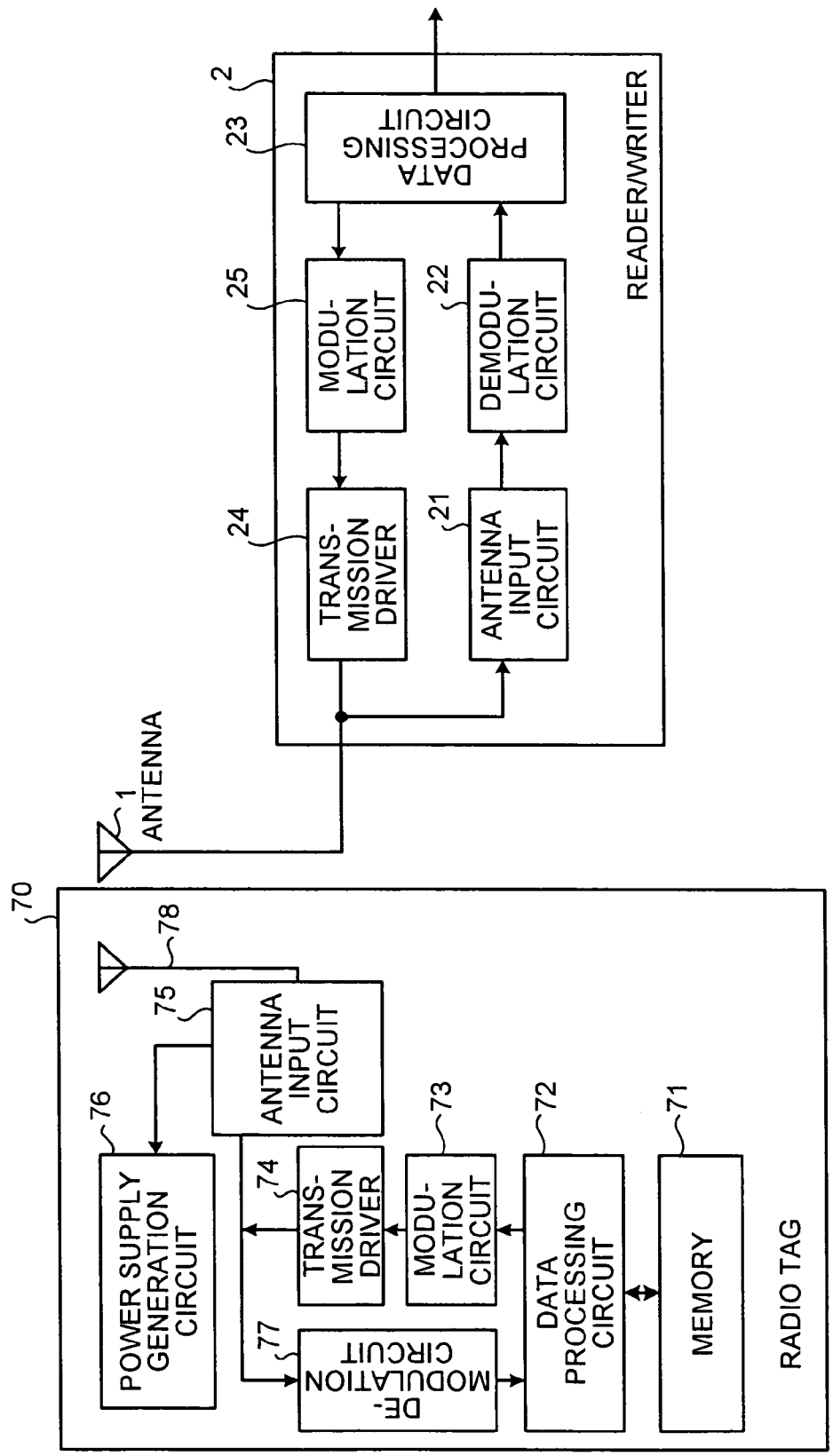
FIG. 6 is a functional block diagram of a radio tag that communicates with a reader/writer.

FIG. 6 is a functional block diagram of a radio tag that communicates with a reader/writer. The radio tag 70 includes a memory 71, a data processing circuit 72, a modulation circuit 73, a transmission driver 74, an antenna input circuit 75, a power supply generation circuit 76, and a demodulation circuit 77.

The memory 71 stores an identification number of the radio tag, contents of the radio tag, and the like. The data processing circuit 72 applies various kinds of data processing to data. The modulation circuit 73 applies modulation processing to transmission data. The transmission driver 74 performs transmission processing. The antenna input circuit 75 performs control for a reception and transmission antenna. The power supply generation circuit 76 rectifies and smoothes a received power wave to thereby generate a stable DC voltage and supplies the DC voltage to the respective circuits as an operation voltage. The demodulation circuit 77 applies demodulation processing to a received signal. Note that the respective blocks of the reader/writer 2 shown in FIG. 6 are as already explained.

Figures 7, 8, 9:
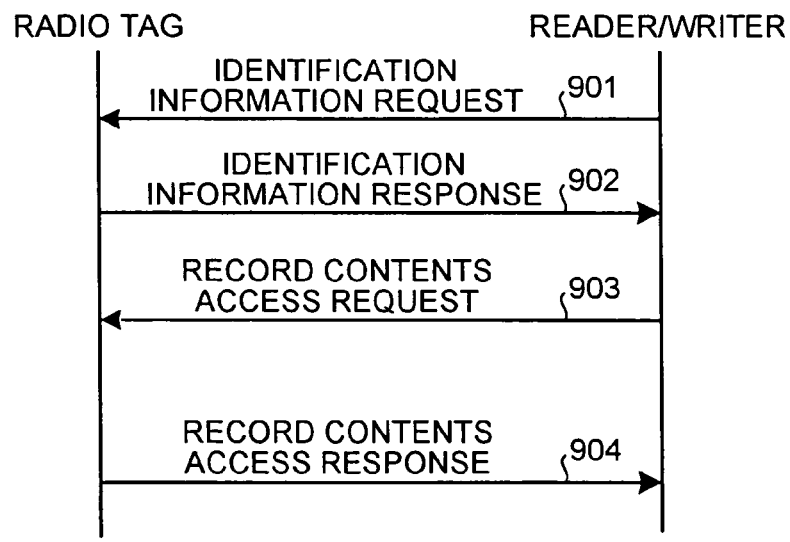
FIG. 7 is a schematic diagram of an example of a format for a radio tag access record.
FIG. 8 is a schematic diagram of an example of a format for a page header.
FIG. 9 is a flowchart illustrating a communication procedure between the reader/writer and the radio tag.

FIG. 7 is a schematic diagram of an example of a format for a radio tag access record. Here, time, a type, a manufacturer, a title, and the number of copies are recorded. Reference numeral 65 in FIG. 6 denotes a radio tag access record at the time when a book is copied. Reference numeral 66 in FIG. 6 is a radio tag access record at the time when an exchange ticket for money is copied.

FIG. 8 is a schematic diagram of an example of a format for a page header. Here, an encoding system, a forgery prevention flag, a tracing pattern number, and a quantization table are shown in the format.

FIG. 9 is a flowchart illustrating a communication procedure between a reader/writer and a radio tag. An identification information request signal transmitted from the data processing circuit 23 of the reader/writer 2 is transmitted by a radio wave from the antenna 1 to the radio tag via the modulation circuit 25 and the transmission driver 24 (arrow 901). A response request signal radio wave received via an antenna 78 and the antenna input circuit 75 is demodulated by the demodulation circuit 77, and a response request signal is transmitted to the data processing circuit 72. The data processing circuit 72, which has received the response request signal, reads out identification information stored in the memory 71 and applies processing to the response request signal. The response request signal is modulated into a radio wave by the modulation circuit 73 and transmitted via the transmission driver 74 and the antenna 78 (arrow 902).

The reader/writer 2, which has received the identification information transmitted from the radio tag, transmits a record contents access request to the radio tag through the same route as described above (arrow 903). The radio tag, which has received the transmitted record content access request, sends a record content access response through the same route as described above (arrow 904).

Figure 10:
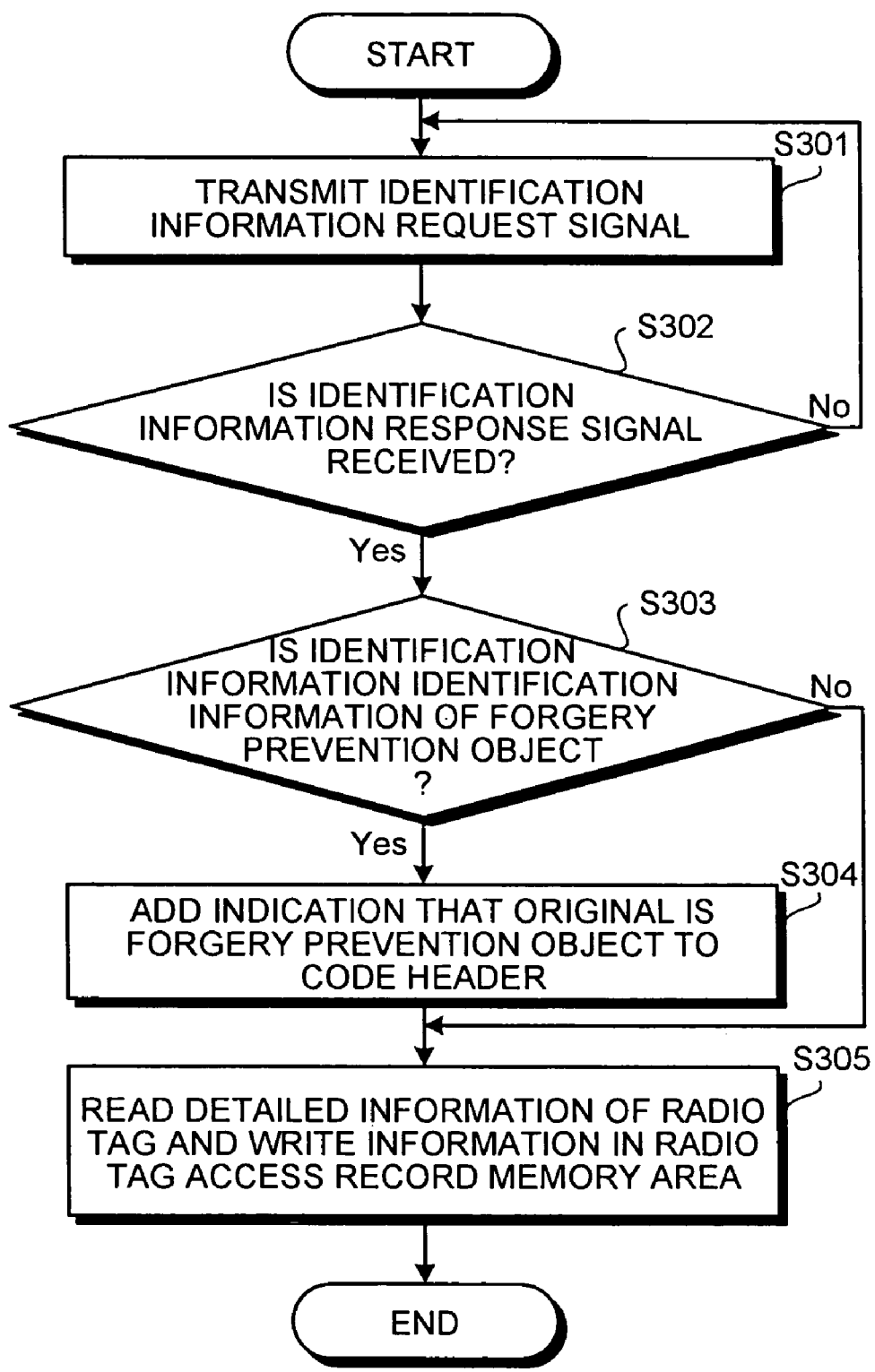
FIG. 10 is a flowchart illustrating a forgery prevention processing in the image processing apparatus according to the first embodiment.

FIG. 10 is a flowchart illustrating a forgery prevention procedure in the image processing apparatus according to the first embodiment. The reader/writer 2 transmits an identification information request signal to a radio tag of an original (step S301). The reader/writer 2 judges whether the identification information response signal is received (step S302). If the identification information response signal is not received (No in step S302), the reader/writer 2 returns to step S301. If the identification information response signal is received (Yes in step S302), the reader/writer 2 judges whether the identification information is identification information of a forgery prevention object (step S303). If it is judged that the identification information is the identification information of the forgery prevention object (Yes in step S303), the reader/writer 2 adds an indication that the original is the forgery prevention object to a code header of the radio tag (step S304). If it is judged that the identification information is not the identification information of the forgery prevention object (No in step S303), the reader/writer 2 reads detailed information of the radio tag and writes the detailed information in a radio tag access record memory area (step S305).

Figure 11:
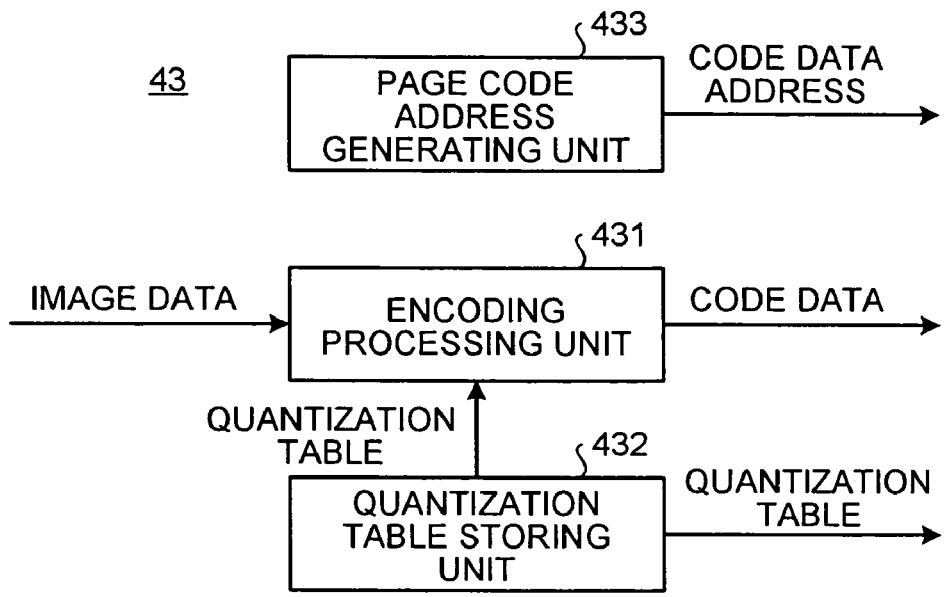
FIG. 11 is a functional block diagram of an encoding unit in FIG. 2.

FIG. 11 is a functional block diagram of the encoding unit in FIG. 2. An encoding processing unit 431 encodes image data according to a system such as JPEG and transfers the code data to the page code memory area 53 of the main memory 5. A quantization table storing unit 432 stores a quantization table necessary for encoding by the encoding processing unit 431. A page code address generating unit 433 generates an address of the page code memory area 53 of the main memory 5.

Figure 12:
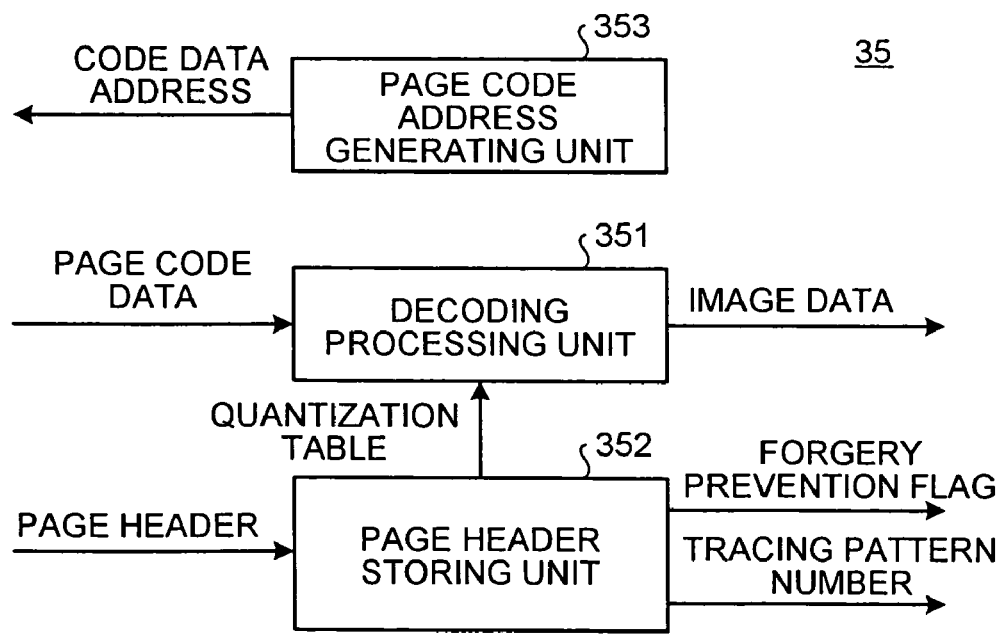
FIG. 12 is a functional block diagram of a page decoding unit in FIG. 2.

FIG. 12 is a functional block diagram of the page decoding unit in FIG. 2. A decoding processing unit 351 decodes code data in the page code memory area 53 of the main memory 5 according to a system such as JPEG. A page header storing unit 352 stores a quantization table, a tracing pattern number, forgery prevention information, and the like necessary for decoding by the decoding processing unit 351. A page code address generating unit 353 generates an address of the page code memory area 53 of the main memory 5.

Figure 13:
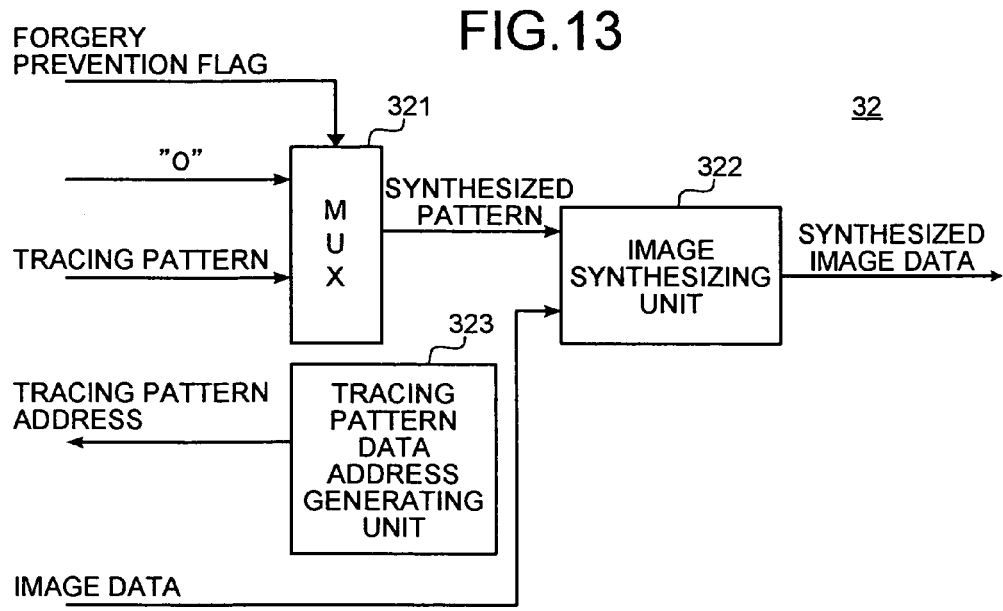
FIG. 13 is a functional block diagram of a forgery prevention processing unit in FIG. 2.

FIG. 13 is a functional block diagram of the forgery prevention processing unit 32 in FIG. 2. When a forgery prevention flag "1" (indicating that an original is a forgery prevention object), an MUX 321 transfers a tracing pattern to an image synthesizing unit 322. When the forgery prevention flag is "0" (indicating that the original is not the forgery prevention object), the MUX 321 transfers a "0" pattern to the image synthesizing unit 322. The image synthesizing unit 322 receives a decoded image from the page decoding unit 35 and the synthesized pattern from the MUX 321 to synthesize an image. A tracing pattern data address generating unit 323 generates an address of the tracing pattern memory area 54 of the main memory 5.

Figure 14:
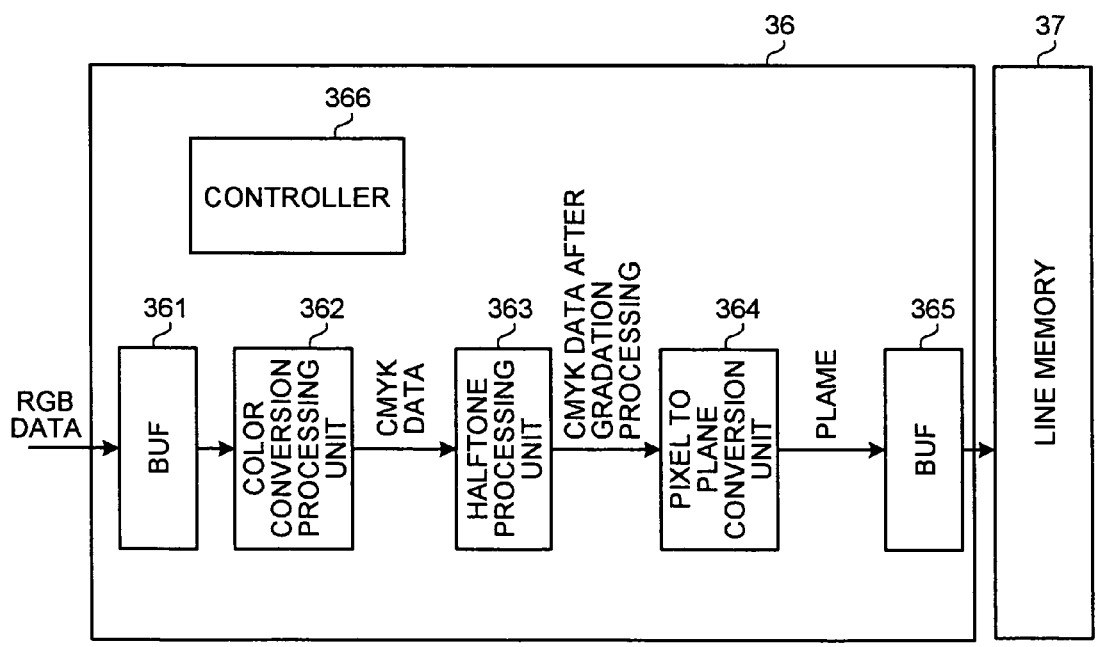
FIG. 14 is a functional block diagram of an image processing unit in FIG. 2.

FIG. 14 is a functional block diagram of the image processing unit 3 in FIG. 2. A buffer 361 temporarily stores image data from the forgery prevention processing unit 32. A color conversion processing unit 362 subjects the image data stored in the buffer 361 to color conversion to convert the image data into CMYK data. A halftone processing unit 363 applies halftone processing to the CMYK data obtained by the color conversion by the color conversion processing unit 362. A PIXEL_TO_PLANE converting unit 364 rearranges the CMYK data after the halftone processing into a word size of a memory for each plane. A buffer 365 temporarily stores data from the PIXEL_TO_PLANE converting unit 364.

The antennas are disposed in the traveling member of the scanner, the reader/writer communicates with the radio tag added to the original via the antennas simultaneously with reading of an image, the radio tag identification number identifying and judging unit identifies a type of the radio tag, and when it is judged that the original is a forgery prevention object, the forgery prevention processing unit applies forgery prevention processing to the original. This makes it possible to judge whether an original is a forgery prevention original accurately in any position of a scanner surface without being affected by a state of a reading device like a lamp of the scanner, soil of an object to be copied, and the like and prevent forgery by copying effectively.

Figure 15:
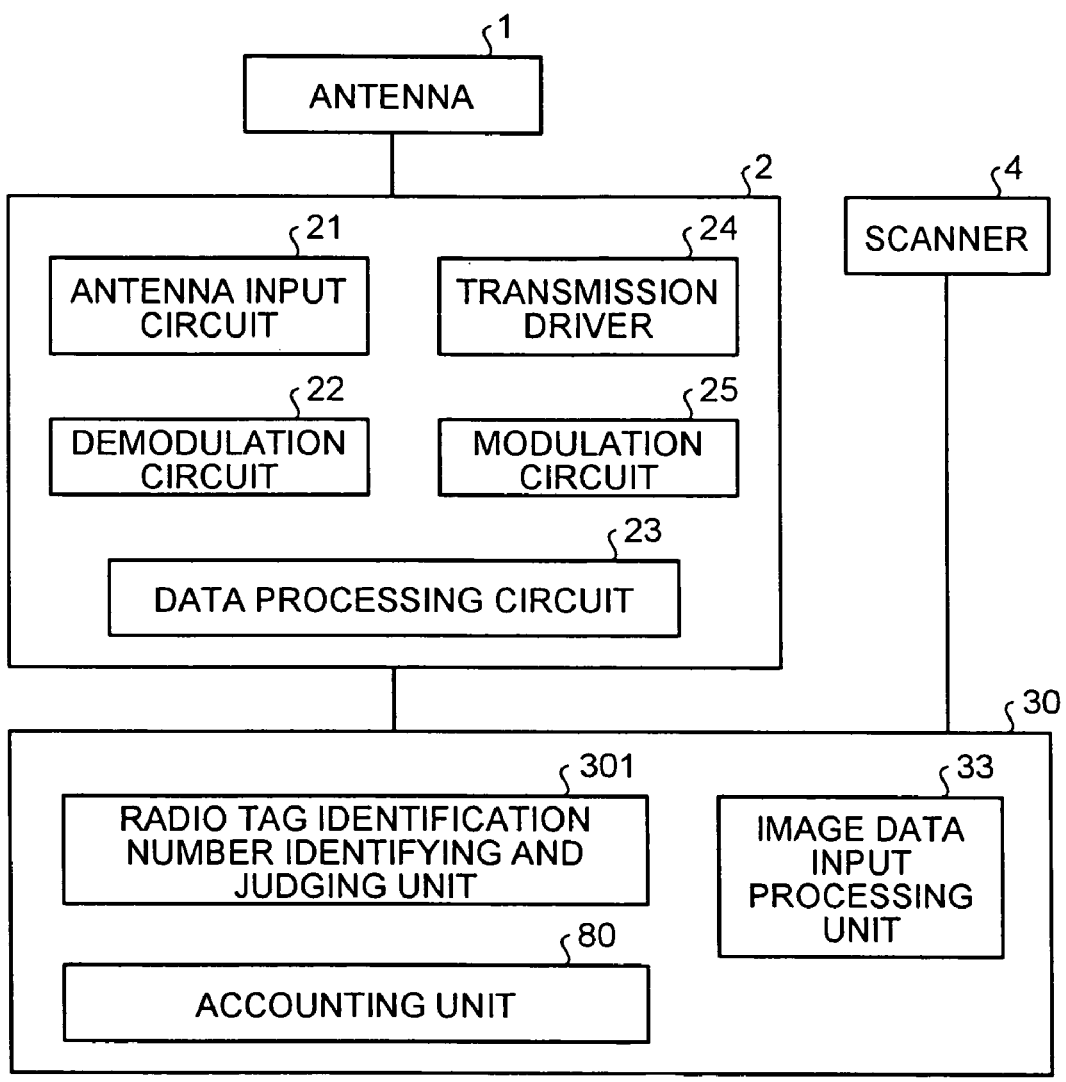
FIG. 15 is a functional block diagram of an image processing apparatus according to a second embodiment of the invention.

FIG. 15 is a functional block diagram of an image processing apparatus according to a second embodiment of the invention. The image processing apparatus according to the second embodiment is different from the image processing apparatus according to the first embodiment in that an image processing unit 30 includes a radio tag identification number identifying and judging unit 301 that identifies a radio tag of an original and judges whether accounting is necessary in copying the original based on copyright and an accounting unit 80 that, when it is judged that the accounting is necessary, performs the accounting in creating a copy. With this structure, when it is judged that the accounting is necessary in copying an original, it is possible to perform accounting for charging a fee based on copyright.

Figure 16:
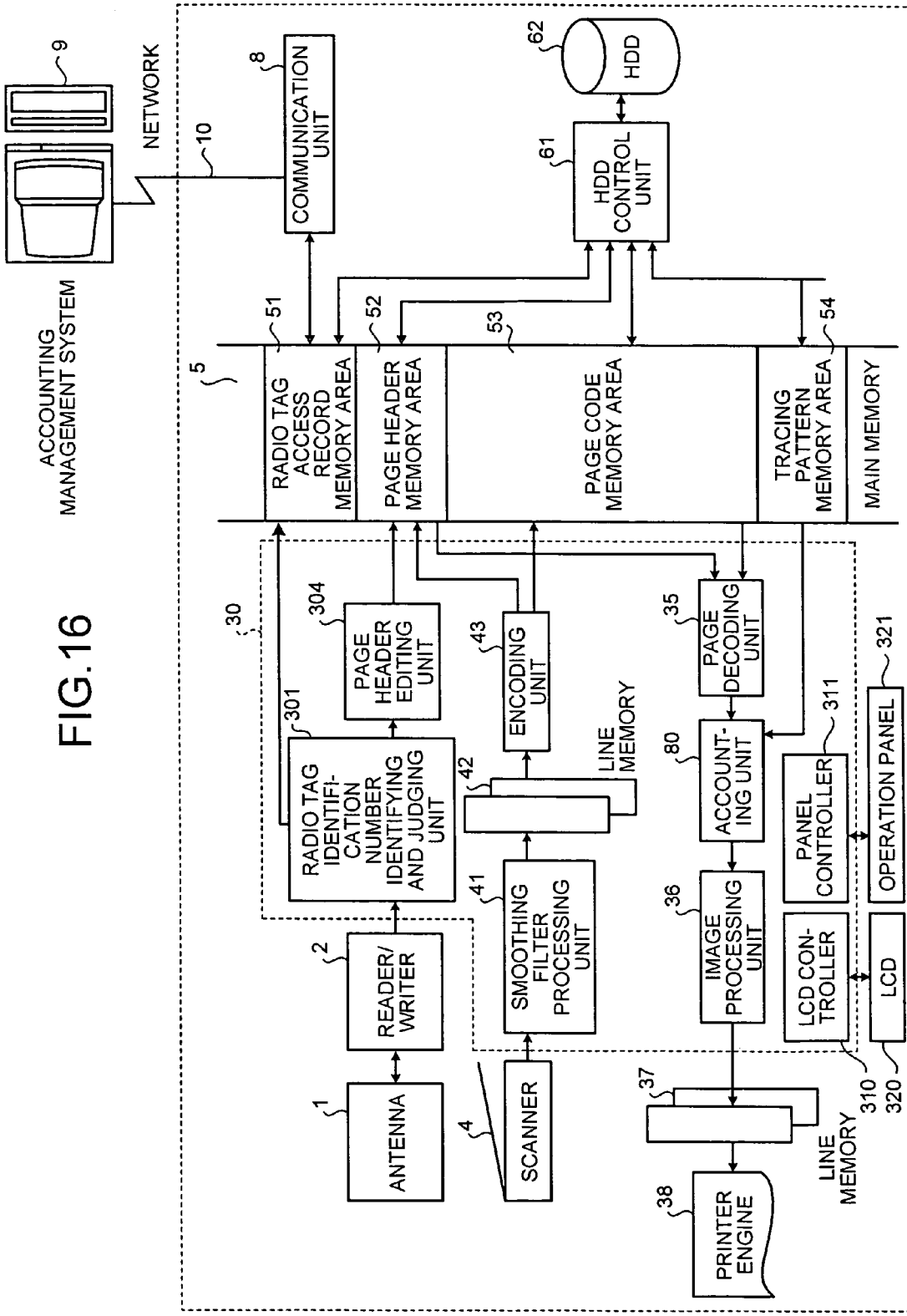
FIG. 16 is an overall diagram of the image processing apparatus according to the second embodiment.
Figure 17:
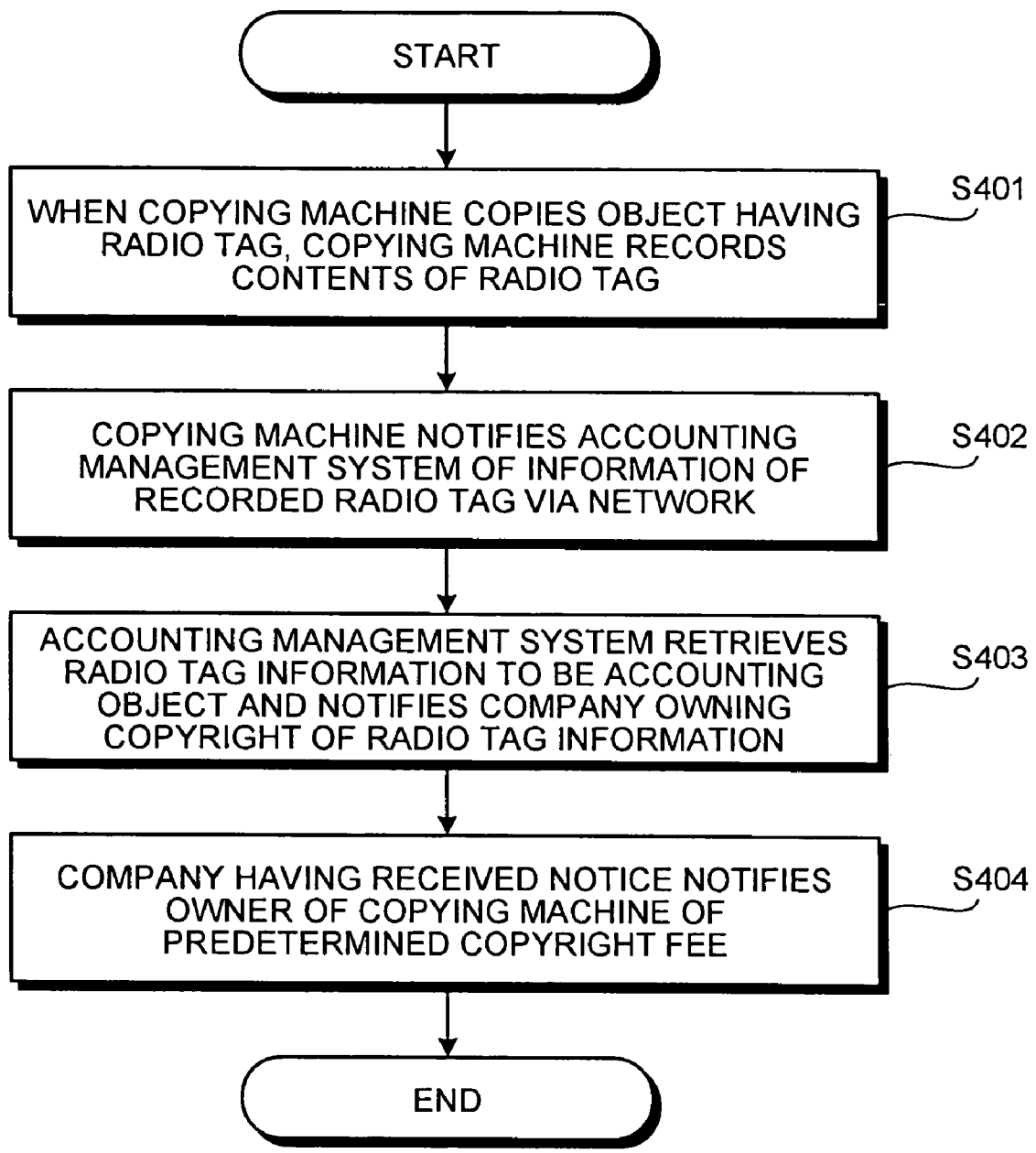
FIG. 17 is a flowchart illustrating a schematic procedure for image processing according to the second embodiment.

FIG. 16 is an overall diagram of the image processing apparatus according to the second embodiment. FIG. 17 is a flowchart illustrating a schematic procedure of image processing according to the second embodiment. With reference to FIGS. 15 to 17, functions of respective units of the image processing apparatus according to the second embodiment will be explained mainly about differences from the image processing according to the first embodiment in accordance with a processing procedure.

The radio tag identification number identifying and judging unit 301 of the image processing unit 30 receives an identification number for a radio tag added to an original via the antenna 1 and identifies the identification number and judges whether the identification number is identification information indicating an accounting object original in copying the original. The radio tag identification number identifying and judging unit 301 records a result of the judgment in the page header memory area 52 of the main memory 5 via a page header editing unit 304.

An LCD controller 310 reads accounting information from the outside received by a communication unit 8 and input information received by an operation panel 321 and controls an LCD (liquid crystal monitor) 320 to display the accounting information and the input information.

The LCD (liquid crystal monitor) 320 is controlled by the LCD controller 310 to display information (the number of copies, a name of a company owning copyright, a message from the company owning the copyright, an amount to be charged, etc.).

The operation panel 321 receives inputs of the number of copies that an operator wishes to make, a reply to the message from the company owning the copyright, and the like when the operator inputs the number of copies, the reply, and the like. A panel controller 311 receives operation information received by the operation panel 321 and transmits the operation information to the communication unit 8.

Here, regardless of whether the original is the accounting object, the identification information of the radio tag identified by the radio tag identification number identifying and judging unit 301 is recorded in the radio tag access recording area 51 of the main memory 5 (step S401).

When the radio tag identification number identifying and judging unit 301 judges that the original is the accounting object, the page header editing unit 304 records information indicating that the original is the accounting object in the page header area 52 of the main memory 5.

Accounting object information from the page header editing unit 304 and a quantization table value from the encoding unit 43 are stored in the page header memory area 52.

The page decoding unit 35 reads the quantization table and the accounting object information from the page header memory area 52, sequentially reads code data of an image from the page code memory area 53 and decodes the code data, and transfers the code data to the accounting unit 80.

The accounting unit 80 reads the tracing pattern information in the main memory 5, applies synthesizing to the image data decoded by the decoding unit 35 based on the accounting object information from the decoding unit 35, and transfers the image data to the image processing unit 36.

The image processing unit 36 receives the image data outputted from the accounting unit 80, applies image processing to the image data, and transfers the image data to the line memory 37.

The communication unit 8 transfers the radio tag access record in the main memory 5 to an accounting management system 9 via a network 10 (step S402).

The accounting management system 9 notifies the company owning the copyright of the number of copies made and the like based on the radio tag access record (e.g., a radio tag access record 65 in FIG. 7) acquired by the copying machine (step S403). When a fee to be charged is notified from the company owning the copyright, the accounting management system 9 notifies the copying machine of the fee to be charged necessary for copying the original (step S404).

Figure 18:
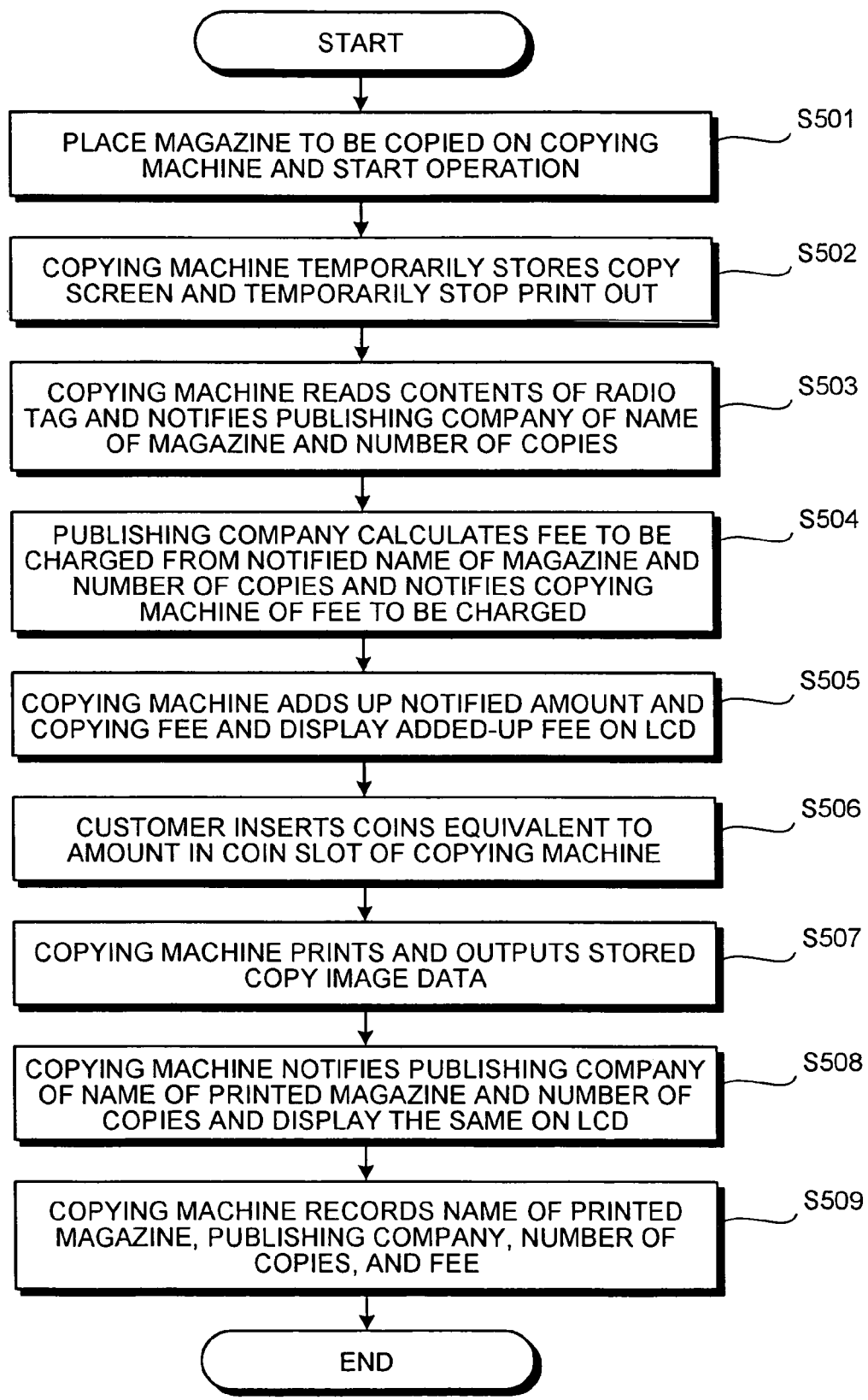
FIG. 18 is a flowchart illustrating a procedure for accounting at the time when the image processing apparatus according to the second embodiment is installed in a bookstore as a copying machine with an accounting function.
Figure 19:
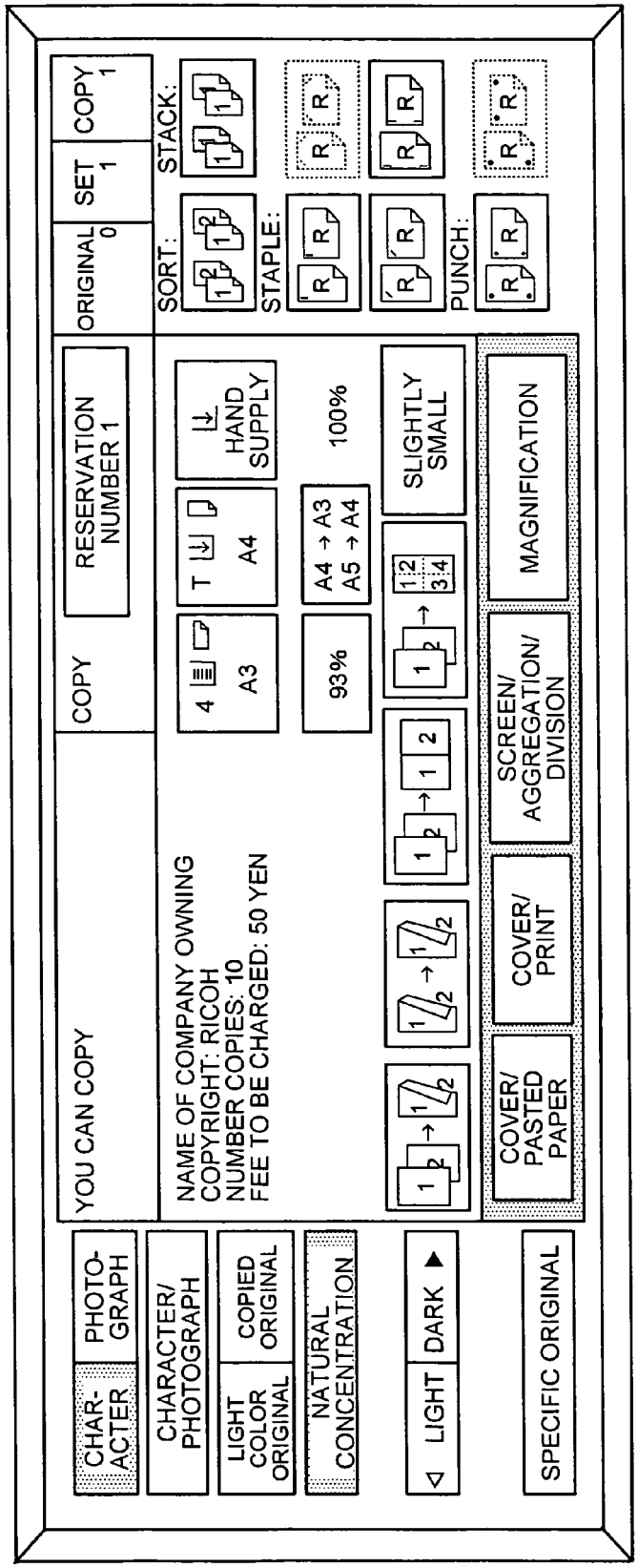
FIG. 19 is a schematic diagram of an example of display of accounting information on an LCD of the image processing apparatus.

FIG. 18 is a flowchart illustrating a procedure of accounting at the time when the image processing apparatus according to the second embodiment is installed in a bookstore as a copying machine with an accounting function. FIG. 19 is a schematic diagram of an example of display of accounting information on an LCD of the image processing apparatus. Here, when a customer does not wish to purchase a magazine sold in the bookstore but wishes to purchase only a part of articles in the magazine, the copying machine copies a part the magazine and performs accounting based on copyright. A flow of a system, in which the copying machine reads a name of a publishing company, a name of the magazine, an email address of the publishing company, and the like from a radio tag of the magazine and pays the publishing company an amount for copying, will be explained.

First, the customer places the magazine to be copied on the copying machine and operates the operation panel 321 while looking at the LCD 320 to perform input operation necessary for a copying action (step S501). The copying machine detects a signal from the radio tag, temporarily stores copied image data, and temporarily stops print output (step S502). The copying machine notifies a company owning the copyright (in the case of FIG. 19, Ricoh®) of a name of a magazine, the number of copies, and a section to be copied from contents of the read radio tag (step S503).

The accounting management system 9 of the company, which has been notified of information concerning copying from the copying machine, calculates a fee to be charged from the magazine to be copied, the section of the magazine to be copied, the number of copies, and the like and notifies the copying machine of the fee to be charged (step S504). The copying machine, which has received the information on an amount of the notified fee to be charged, adds up the charged fee and a copying fee and causes the LCD 320 to display the added-up fee to notify the customer of the fee (step S505). Here, as shown in FIG. 19, it is indicated that the number of copies is 10 and the fee to be charged is 50 yen. The customer, who has been notified of the added-up fee, inserts coins equivalent to the notified amount in a coin slot of the copying machine (step S506). The copying machine prints out the copy image data temporarily stored therein (step S507). The copying machine notifies the publishing company of the name of the printed magazine, the printed section, and the number of copies and causes the LCD 320 to display the name of the printed magazine, the printed section, and the number of copies and notifies the customer of the same (step S508). The copying machine records the name of the printed magazine, the publishing company of the magazine, the printed section, the number of copies, and the fee (step S509).

The antennas are disposed in the traveling member of the scanner, the reader/writer communicates with a radio tag added to an original via the antennas simultaneously with reading of an image, the radio tag identification number identifying and judging unit identifies a type of the radio tag, and when it is judged that the original is an accounting object, the accounting processing unit applies accounting to the original. This makes it possible to judge whether an original is an original requiring accounting accurately in any position of a scanner surface without being affected by a state of a reading device like a lamp of the scanner, soil of an object to be copied, and the like and perform accounting before applying image processing to the original.

Figure 20:
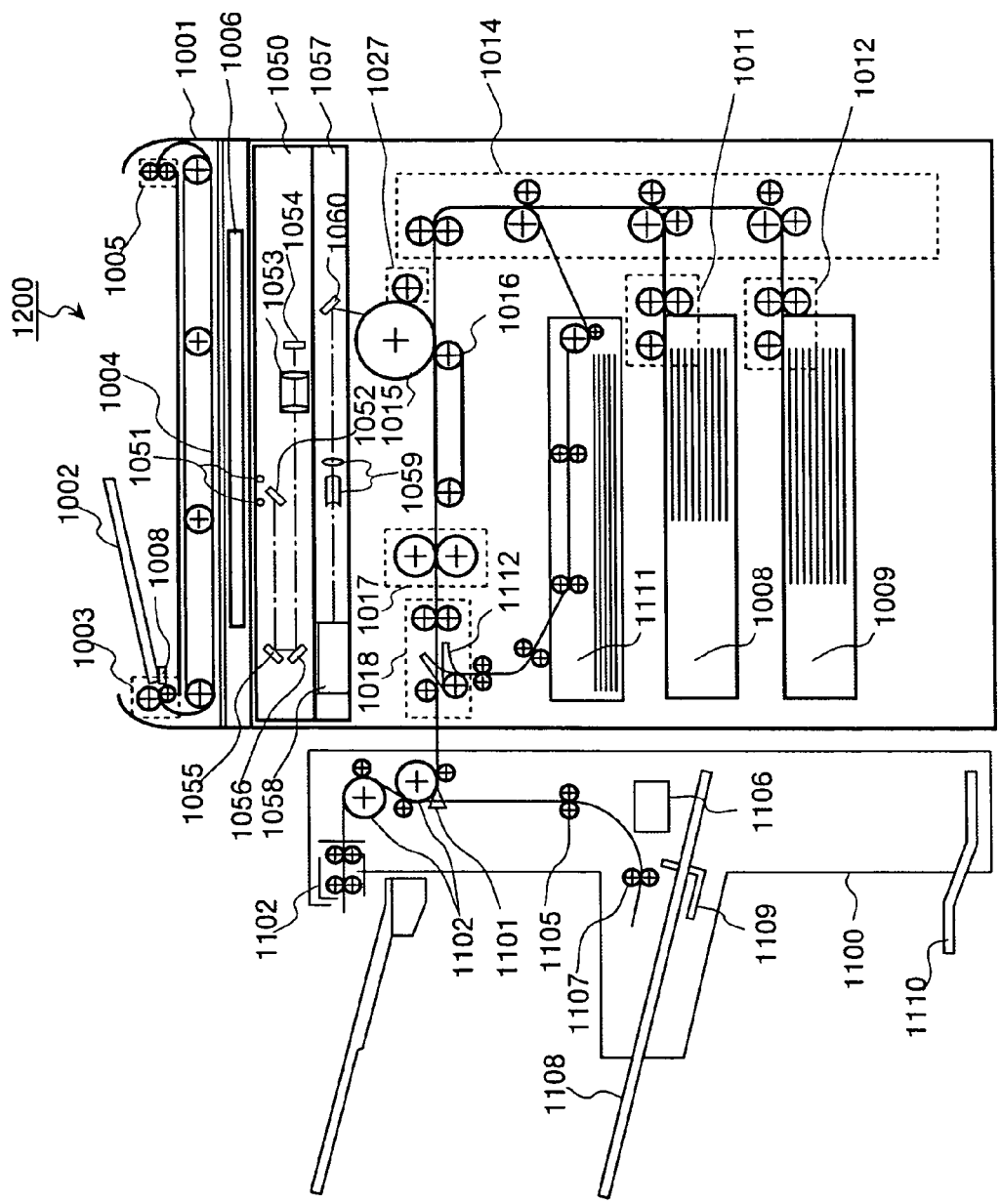
FIG. 20 is a diagram illustrating an internal mechanism of a copying machine including the image processing apparatus according to the embodiments.

FIG. 20 is a diagram illustrating an internal mechanism of a copying machine including the image processing apparatus according to the embodiments of the invention. A stack of originals are placed with image surfaces thereof faced upward on an original stand 1002 in an automatic document feeder (hereinafter referred to as ADF) 1001 included in a copying machine 1200. When a start key on an operation unit is depressed, the originals are fed to a predetermined position on a contact glass 1006 one by one from the original at the bottom by a feeding roller 1003 and a feeding belt 1004. After image data of the original on the contact glass 1006 is read by a reading unit 1050, the original from which the image data has been read is discharged by the feeding belt 1004 and the discharging roller 1005. When an original set detector 1007 detects presence of the next original on the original stand 1002, the original is fed onto the contact glass 1006 in the same manner as the previous original. The feeding roller 1003, the feeding belt 1004, and the discharging roller 1005 are driven by a motor.

Here, the originals may be placed on the contact glass 1006 to be served for copying rather than being set in the ADF. In particular, when a radio tag has a capacity that does not allow originals to be set in the ADF, it is effective to place the originals on the contact glass 1006 to be served for copying.

Each of transfer sheets serving as recording media stacked on a first tray 1008 or a second tray 1009 is fed by a first sheet feeding unit 1011 or a second sheet feeding unit 1012 and conveyed to a position, where the transfer sheet comes into abutment against a photosensitive member 1015, by a vertical conveying unit 1014. The image data read by the reading unit 1050 is written on the photosensitive member 1015 by a laser from a writing unit 1057. The photosensitive member 1015 passes a developing unit 1027, whereby a toner image is formed thereon. Then, while the transfer sheet is conveyed by a conveyor belt 1016 at a speed equal to a speed of rotation of the photosensitive member 1015, the toner image on the photosensitive member 1015 is transferred onto the transfer sheet. Thereafter, an image formed on the transfer sheet is fixed by a fixing unit 1017, and the transfer sheet is discharged to a finisher 1100 in a post processing unit by a sheet discharging unit 1018.

The finisher 1100 in the post processing unit can guide the transfer sheet, which is conveyed by a sheet discharging roller 1019 of an apparatus body, in a direction of a usual sheet discharging roller 1102 and a direction of a staple processing unit. It is possible to discharge the transfer sheet to a usual sheet discharge tray 1104 side through a conveying roller 1103 by switching a switching plate 1101 to an upward direction. In addition, it is possible to convey the transfer sheet to a stable stand 1108 through conveying rollers 1105 and 1107 by switching the switching plate 1101 to a downward direction.

The transfer sheets stacked on the stable stand 1108 are aligned at paper end faces thereof by a jogger for sheet alignment 1109 every time one transfer sheet is discharged to the stable stand 1108. Then, the transfer sheets are stapled by a stapler 1106 simultaneously with completion of one copy. A group of transfer sheets stapled by the stapler 1106 are stored in a staple completion sheet discharge tray 1110 due to an own weight thereof.

On the other hand, the usual sheet discharge tray 1108 is a sheet discharge tray that is movable back and forth. The sheet discharge tray 1108 movable back and forth moves back and forth for each original or for each sorted copy to simply sort copy sheets to be discharged.

When an image is formed on both sides of a transfer sheet, a transfer sheet fed from the respective sheet feed trays 1008 and 1009 and having an image formed thereon is not guided to a sheet discharge tray side but is temporarily stocked in a double-sided sheet feeding unit 1111 by setting a branching claw 1112 for route switching to an upper side. Thereafter, the transfer sheet stocked in the double-sided sheet feeding unit 1111 is fed from the double-sided sheet feeding unit 1111 again to have the toner image formed on the photosensitive member 1015 transferred thereon again. The branching claw 1112 for route switching is set to a lower side to guide the transfer sheet to the sheet discharge tray 1104. In this way, the double-sided sheet feeding unit 1111 is used when an image is formed on both sides of the transfer sheet.

The photosensitive member 1015, the conveyor belt 1016, the fixing unit 1017, the sheet discharging unit 1018, and the developing unit 1027 are driven by a main motor. A driving force of the main motor is transmitted to the sheet feeding units 1011 and 1012 by sheet feeding clutches to drive the sheet feeding units 1011 and 1012, respectively. The driving force of the main motor is transmitted to the vertical conveying unit 1014 by an intermediate clutch to drive the vertical conveying unit 1014. The reading unit (scanner) 1050 includes the contact glass 1006, on which an original is placed, and an optical scanning system. The optical scanning system includes an exposing lamp 1051, a first mirror 1052, a lens 1053, and a CCD image sensor.

The exposing lamp 1051 and the first mirror 1052 are fixed on a not-shown first carriage, and a second mirror 1055 and a third mirror 1056 are fixed on a not-shown second carriage. When an image on an original is read, the first carriage and the second carriage are mechanically moved for scanning at relative speed of 2 to 1 such that an optical path length is not changed. This optical scanning system is driven by a not-shown scanner drive motor. The image on the original is read by the CCD image sensor 1054, converted into an electric signal (analog image signal), and then converted into digital data (image data). The image data is further subjected to several kinds of image processing.

The lens 1053 and the CCD image sensor 1054 are moved in a left-to-right direction in FIG. 1, whereby an image magnification is changed. In other words, positions of the lens 1053 and the CCD image sensor 1054 are set in the left-to-right direction in association with a designated magnification. The writing unit 1057 includes a laser output unit 1058, a focusing lens 1059, and a mirror 1060. A laser diode serving as a laser light source and a rotating polygon mirror, which is rotated at a high constant speed by a motor, are provided inside the laser output unit 1058. A laser beam irradiated from the laser output unit 1058 is polarized by the polygon mirror rotating at a constant speed to pass through the focusing lens 1059, returned by the mirror 1060, and condensed and focused on a photosensitive member surface.

The polarized laser beam is used for exposure and scanning in a direction perpendicular to a direction of rotation of the photosensitive member (main scanning direction) to record an image signal, which is outputted from a selector 1064 of an image processing apparatus to be described later, by a unit of line. An image (electrostatic latent image) is formed on the photosensitive member surface by repeating main scanning at a predetermined period corresponding to rotating speed of the photosensitive member and a recording density. As described above, the laser beam outputted from the writing unit 1057 is irradiated on the photosensitive member 1015 of the image forming system. Although not shown in the figure, a beam sensor, which generates a main scanning synchronization signal, is arranged in a position on which a laser beam is irradiated near the photosensitive member 1015. A control signal for performing control for image recording start timing in the main scanning direction and input/output of an image signal to be described later is generated based on this main scanning synchronization signal.

Figure 22:
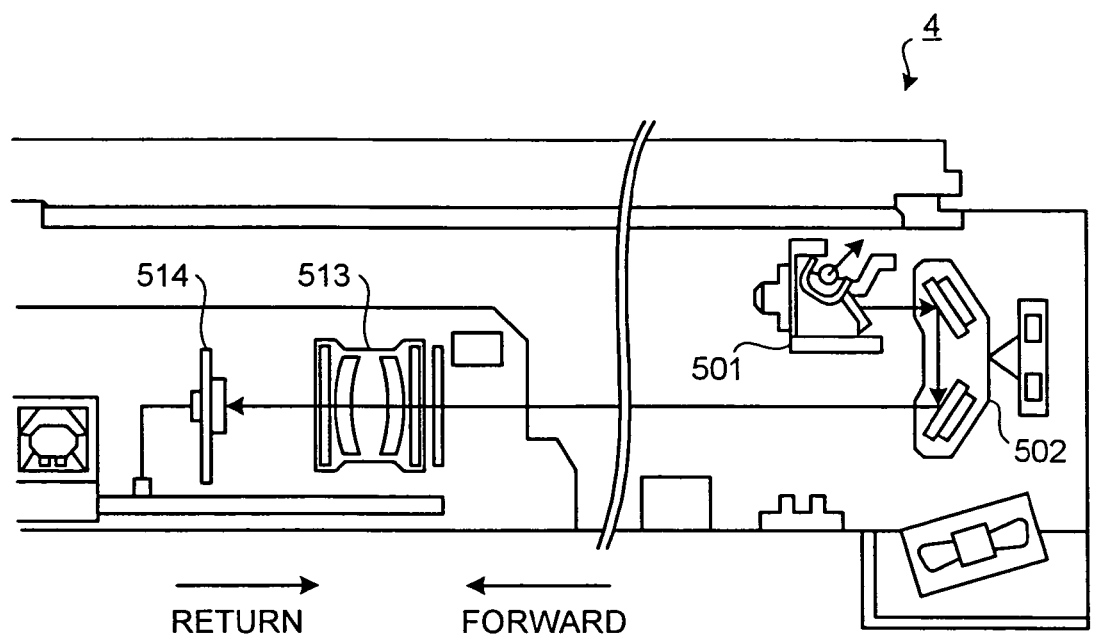
FIG. 22 is a schematic diagram of an optical system included in the copying machine shown in FIG. 20.

FIG. 21 is a schematic diagram of a scanner included in the copying machine shown in FIG. 20. FIG. 22 is a schematic diagram of an optical system included in the copying machine shown in FIG. 20. In the scanner 4, a first carriage 501 and a second carriage 502 are driven in a forward direction and a return direction opposite to the forward direction by two wires 503 stretched symmetrically. A luminance of an image on an original is converted into an electric signal by a CCD 514 while the first carriage 501 and the second carriage 502 are driven in the forward direction. The wires 503 are wound around pulleys 505, which are formed integrally with a drive shaft 504, and driven by rotation of the pulleys 505. One of the pulleys 505 is coupled to a pulley 507, which is formed integrally with a shaft of a stepping motor 508, by a timing belt 506. When the stepping motor 508 rotates in a normal direction, the first carriage 501 moves in the forward direction and the second carriage 502 moves in the same direction at speed half the speed of the first carriage 501.

Reference numeral 501 in FIG. 21 denotes a traveling member, which irradiates light in the main scanning direction, sends reflected light of the light to the CCD 514 in the main scanning direction via a mirror, and sequentially moves in the sub-scanning direction. Reference numeral 513 denotes a lens. The antenna 1 in the embodiments is disposed in this traveling member 501.

FIG. 23 is a diagram of an example of a hardware structure of the image processing apparatus according to the embodiments. It is possible to realize the image processing apparatus described above by executing a program prepared in advance in a computer system like a personal computer or a workstation. A computer 700 is entirely controlled by a central processing unit (CPU) 701. A read only memory (ROM) 702, a random access memory (RAM) 703, a hard disk drive (HDD) 704, a graphic processing device 705, and an input interface 706 are connected to the CPU 701 via a bus 707. At least part of programs of an operating system (OS) and application programs, which are executed by the CPU 701, are stored in the ROM 702 and the RAM 703. In addition, various kinds of data necessary for processing by the CPU 701 are stored in the RAM 703. The OS, various driver programs, application programs, detected data, and the like are stored in the HDD 704.

A monitor 711 is connected to the graphic processing device 705. The graphic processing device 705 displays an image on a screen of the monitor 711 according to an instruction from the CPU 701. A keyboard 712 and a mouse 713 are connected to the input interface 706. The input interface 706 transmits signals, which are sent from the keyboard 712 and the mouse 713, to the CPU 701 via the bus 707. An image output device 710 connected to the bus 707 outputs an image based on image data subjected to image processing.

A data synchronization program, which is executed in the image processing apparatus of the embodiments, is recorded in a computer readable recording medium like a CD-ROM, a floppy® disk, or a DVD and provided as a file of an installable format or an executable format.

The image processing program of this embodiment may be stored on a computer, which is connected to a network like the Internet, to be provided and distributed by downloading through the network.

In the image processing apparatus according to an embodiment of the invention, when an original added with a radio tag is copied, the radio wave receiving unit disposed in the traveling member detects a radio wave of the radio tag. Thus, there is an effect that it is possible to judge that the original is a forgery prevention object original accurately and apply forgery prevention processing to the original to prevent forgery of the original.

In the image processing apparatus according to an embodiment of the invention, tracing pattern information is displayed on a copied product. Thus, there is an effect that it is possible to judge that an original is the forgery prevention object original accurately and apply traceable forgery prevention processing to the original to prevent forgery of the original.

In the image processing apparatus according to an embodiment of the invention, a forgery judgment result is recorded in a header of the copied product. Thus, there is an effect that it is possible to judge that an original is the forgery prevention object original accurately and record the forgery judgment result to prevent forgery of the original.

In the image processing apparatus according to an embodiment of the invention, it is possible to keep radio tag information added to an original as a record. Thus, there is an effect that it is possible to judge whether an original is the forgery prevention object original accurately and keep radio tag information of the original as a record to prevent forgery of the original.

In the image processing apparatus according to an embodiment of the invention, when an original added with a radio tag is copied, the radio wave receiving unit disposed in the traveling member detects a radio wave of the radio tag. Thus, there is an effect that it is possible to judge that the original is an accounting object original and carry out accounting at the time of copying.

In the image processing method according to an embodiment of the invention, when an original added with a radio tag is copied, a radio wave of the radio tag is detected. Thus, there is an effect that it is possible to judge that the original is a forgery prevention object original accurately and apply forgery prevention processing to the original to prevent forgery of the original.

In the image processing method according to an embodiment of the invention, when an original added with a radio tag is copied, a radio wave of the radio tag is detected. Thus, there is an effect that it is possible to judge that the original is an accounting object original and carry out accounting at the time of copying.

In the program according to an embodiment of the invention, there is an effect that it is possible to cause a computer to execute one of the image processing methods described above.

An approach may be to embed a radio tag in an exchange ticket for money, a security, a ticket, or the like, communicate with the radio tag to judge whether the exchange ticket for money, the security, the ticket, or the like is a forgery prevention object. However, the radio tag used for the exchange ticket for money, the security, the ticket, or the like generally may have a short communication distance in a range of several millimeters to several centimeters to reduce an area of the radio tag.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus that reads a document to be copied with a reading unit and applies image processing to read image data, comprising:

a radio wave receiving unit that is disposed in a traveling member of the reading unit and receives a radio wave transmitted from a radio tag when the document is read by the reading unit;

a radio demodulation unit that demodulates the radio wave received by the radio wave receiving unit to obtain a demodulated signal;

an identification unit that identifies identification information for the radio tag from the demodulated signal;

a forgery judging unit that judges whether the document is a forgery prevention object according to the identification information identified by the identification unit; and a forgery preventing unit that, when the forgery judging unit judges that the document is the forgery prevention object, performs forgery prevention image processing on the read image data to prevent forgery of the read image data.

2. The image processing apparatus according to claim 1, wherein the forgery preventing unit includes an image synthesizing unit that combines tracing pattern information, which indicates that the document is the forgery prevention object, with the read image data.

3. The image processing apparatus according to claim 1, wherein the forgery preventing unit includes a header editing unit that records a result of the forgery judgment in a header of the read image.

4. The image processing apparatus according to claim 1, wherein the identification unit includes a radio tag information recording unit that records information in the read radio tag.

5. An image processing apparatus that reads a document to be copied with a reading unit and applies accounting to image processing for read image data, comprising:

a radio wave receiving unit that is disposed in a traveling member of the reading unit and receives a radio wave transmitted from a radio tag when the document is read by the reading unit;

a radio demodulation unit that demodulates the radio wave received by the radio wave receiving unit to obtain a demodulated signal;

an identification unit that identifies identification information for the radio tag from the demodulated signal;

an accounting judging unit that judges whether the document is an accounting object original requiring the accounting for the image processing for the read image data according to the identification information identified by the identification unit; and an accounting unit that, when the accounting judging unit judges that the document is the accounting object original, applies the accounting to the image processing for the read image data, wherein the accounting includes calculating a fee to be charged for the image processing for the read image data.

6. An image processing method for reading a document to be copied and applying image processing to read image data, comprising:

receiving a radio wave transmitted from a radio tag when the document is read;

demodulating the radio wave received to obtain a demodulated signal;

identifying identification information for the radio tag from the demodulated signal;

judging whether the document is a forgery prevention object according to the identification information identified; and performing forgery prevention image processing on the read image data to prevent forgery of the read image data when it is judged in the judging that the document is the forgery prevention object.

7. An image processing method for reading a document to be copied and applies accounting to image processing for read image data, comprising:

receiving a radio wave transmitted from a radio tag when the document is read;

demodulating the radio wave received to obtain a demodulated signal;

identifying identification information for the radio tag from the demodulated signal;

judging whether the document is an accounting object original requiring accounting for the image processing for the read image data according to the identification information; and carrying out accounting processing to the image processing for the read image data when it is judged in the judging that the document is the accounting object original, wherein the accounting processing includes calculating a fee to be charged for the image processing for the read image data.

8. A computer-readable storage medium that stores therein a computer program that causes a computer to execute an image processing method for reading a document to be copied and applying image processing to read image data, the computer program causing the computer to execute:

receiving a radio wave transmitted from a radio tag when the document is read;

demodulating the radio wave received to obtain a demodulated signal;

identifying identification information for the radio tag from the demodulated signal;

judging whether the document is a forgery prevention object according to the identification information identified; and performing forgery prevention image processing on the read image data to prevent forgery of the read image data when it is judged in the judging that the document is the forgery prevention object.

9. A computer-readable storage medium that stores therein a computer program that causes a computer to execute an image processing method for reading a document to be copied and applying image processing to read image data, the computer program causing the computer to execute:

receiving a radio wave transmitted from a radio tag when the document is read;

demodulating the radio wave received to obtain a demodulated signal;

identifying identification information for the radio tag from the demodulated signal;

judging whether the document is an accounting object original requiring accounting for the image processing for the read image data according to the identification information; and carrying out accounting processing to the image processing for the image data when it is judged in the judging that the document is the accounting object original, wherein the accounting processing includes calculating a fee to be charged for the image processing for the read image data.

* * * * *